United States Patent [19]

Mitchell et al.

[11] Patent Number: 5,609,067
[45] Date of Patent: Mar. 11, 1997

[54] TRANSMISSION CONTROL FAULT DETECTION

[75] Inventors: Randall M. Mitchell, Washington; Ashok Kajjam; Alan L. Stahl, both of Peoria, all of Ill.

[73] Assignee: Caterpillar Inc., Peoria, Ill.

[21] Appl. No.: 323,281

[22] Filed: Oct. 14, 1994

[51] Int. Cl.⁶ .......................... F16H 59/46; F16H 61/12; B60K 41/22
[52] U.S. Cl. .................. 74/336 R; 192/3.63; 477/906
[58] Field of Search ................... 192/3.21, 3.63; 74/336 R; 475/119; 477/906

[56] References Cited

U.S. PATENT DOCUMENTS

| | | | |
|---|---|---|---|
| 4,414,863 | 11/1983 | Heino | 74/866 |
| 4,724,939 | 2/1988 | Lockhart et al. | 192/3.3 |
| 4,875,391 | 10/1989 | Leising et al. | 74/866 |
| 4,918,606 | 4/1990 | Ito et al. | 364/424.1 |
| 4,953,679 | 9/1990 | Okino | 192/0.096 |
| 4,955,255 | 9/1990 | Yamaashi et al. | 74/856 |
| 4,955,256 | 9/1990 | Kashihara et al. | 74/866 |
| 4,960,091 | 10/1990 | Aufmkolk | 123/399 |
| 4,975,845 | 12/1990 | Mehta | 364/424.1 |
| 5,005,680 | 4/1991 | Satoh et al. | 192/3.55 |
| 5,033,328 | 7/1991 | Shimanaka | 74/866 |
| 5,046,175 | 9/1991 | Lentz et al. | 364/424.1 |
| 5,067,374 | 11/1991 | Sakai et al. | 74/866 |
| 5,072,390 | 12/1991 | Lentz et al. | 364/424.1 |
| 5,090,269 | 2/1992 | Ohtsuka et al. | 74/861 |
| 5,097,726 | 3/1992 | Asada | 74/866 |
| 5,103,692 | 4/1992 | Shimanaka | 74/857 |
| 5,113,720 | 5/1992 | Asayama et al. | 74/866 |
| 5,157,607 | 10/1992 | Stainton et al. | 364/424.1 |
| 5,174,137 | 12/1992 | Kato et al. | 73/118.1 |
| 5,315,972 | 5/1994 | Judy et al. | 123/198 D |
| 5,370,016 | 12/1994 | Fujita et al. | 74/336 R |

FOREIGN PATENT DOCUMENTS

| | | |
|---|---|---|
| 0310275 | 4/1989 | European Pat. Off. . |
| 0357184 | 3/1990 | European Pat. Off. . |
| 0393884 | 10/1990 | European Pat. Off. . |
| 3-213769 | 9/1991 | Japan .................. 477/906 |
| 2084673 | 9/1981 | United Kingdom . |
| 2213220 | 8/1989 | United Kingdom . |

OTHER PUBLICATIONS

Article entitled "Transmission Control System for Bulldozers" from Off–Highway Engineering dated Apr. 1993 (pp. 23 through 29).
SAE Paper 861170 entitled "Digital Electronic Controls for Detroit Diesel Allison Heavy Hauling Transmissions" by Boyer dated Sep. 1986.
SAE Paper 880480 entitled "Borg–Warner Australia Model 85 Automatic Transmission" by Wilfinger & Thompson dated 1988.
SAE Paper 890530 entitled "Nissan Electronically Controlled Four Speed Auto. Transmission" by Shinohara, Minoi dated 1989.
SAE paper 901557 entitled "A Transmission Control System for Const. Machinery" by Kusaka & Ohkura dated Sep. 1990.
SAE paper 901592 entitled "Adaptive Electronic Tractor Shift Control System" by Ross & Panoushek dated Sep. 1990.
U.S. Application 08/021,439 filed Feb. 24, 1993 entitled "Drivetrain Sensor and Diagnostic System"(Inventor: Birchenough et al).

*Primary Examiner*—Rodney H. Bonck
*Assistant Examiner*—Nathan O. Jensen
*Attorney, Agent, or Firm*—Steven R. Janda

[57] ABSTRACT

A diagnostic system is provided for detecting a fault condition in a transmission having a plurality of rotating components, a plurality of clutches, and a transmission control. The diagnostic system includes speed sensors producing speed and direction signals representative of the rotational velocity of the rotating components, a processor for calculating the relative rotational speed between two or more clutches and for indicating a fault condition in response to the relative rotational speed and a period of time.

29 Claims, 34 Drawing Sheets

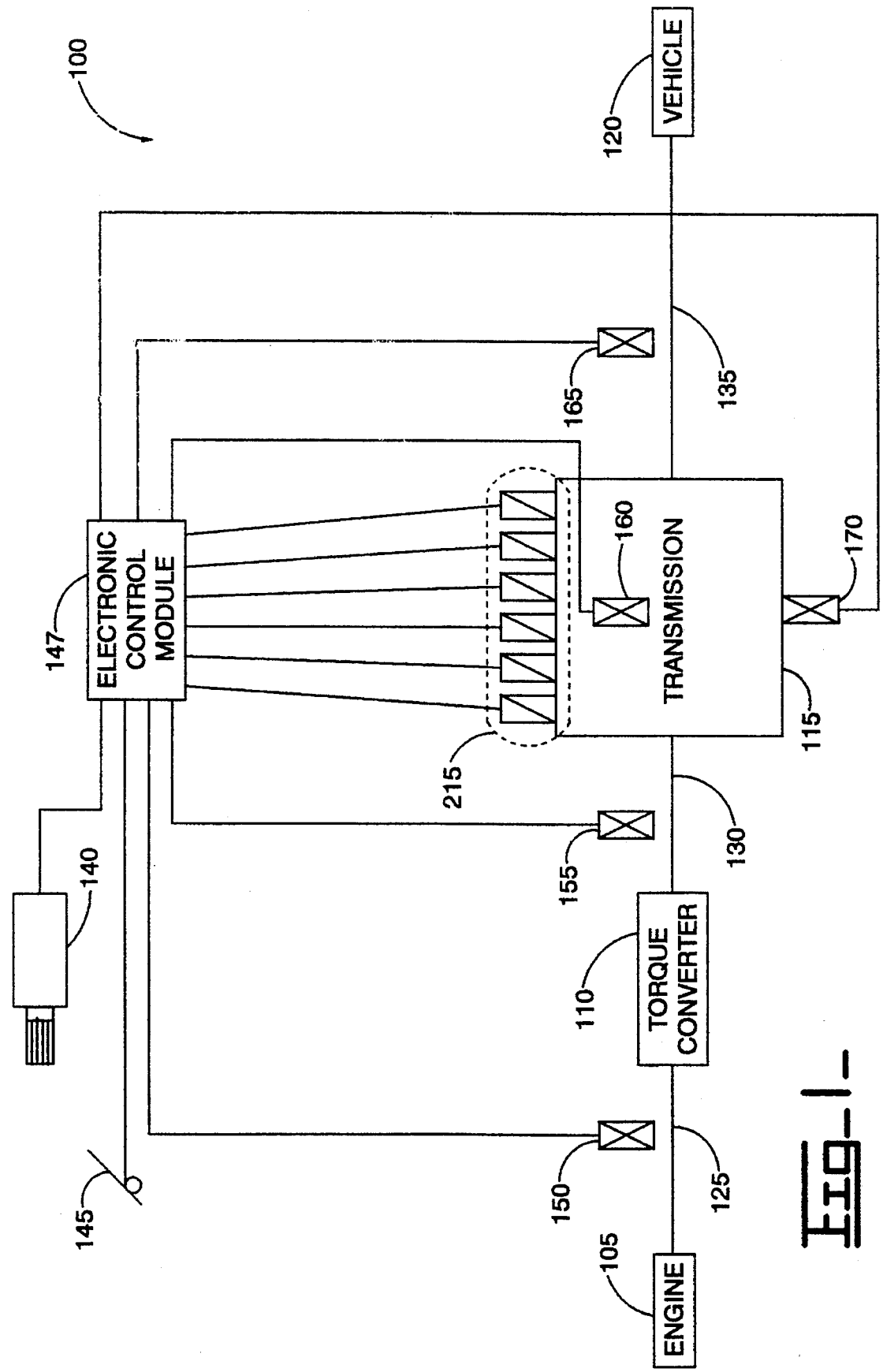

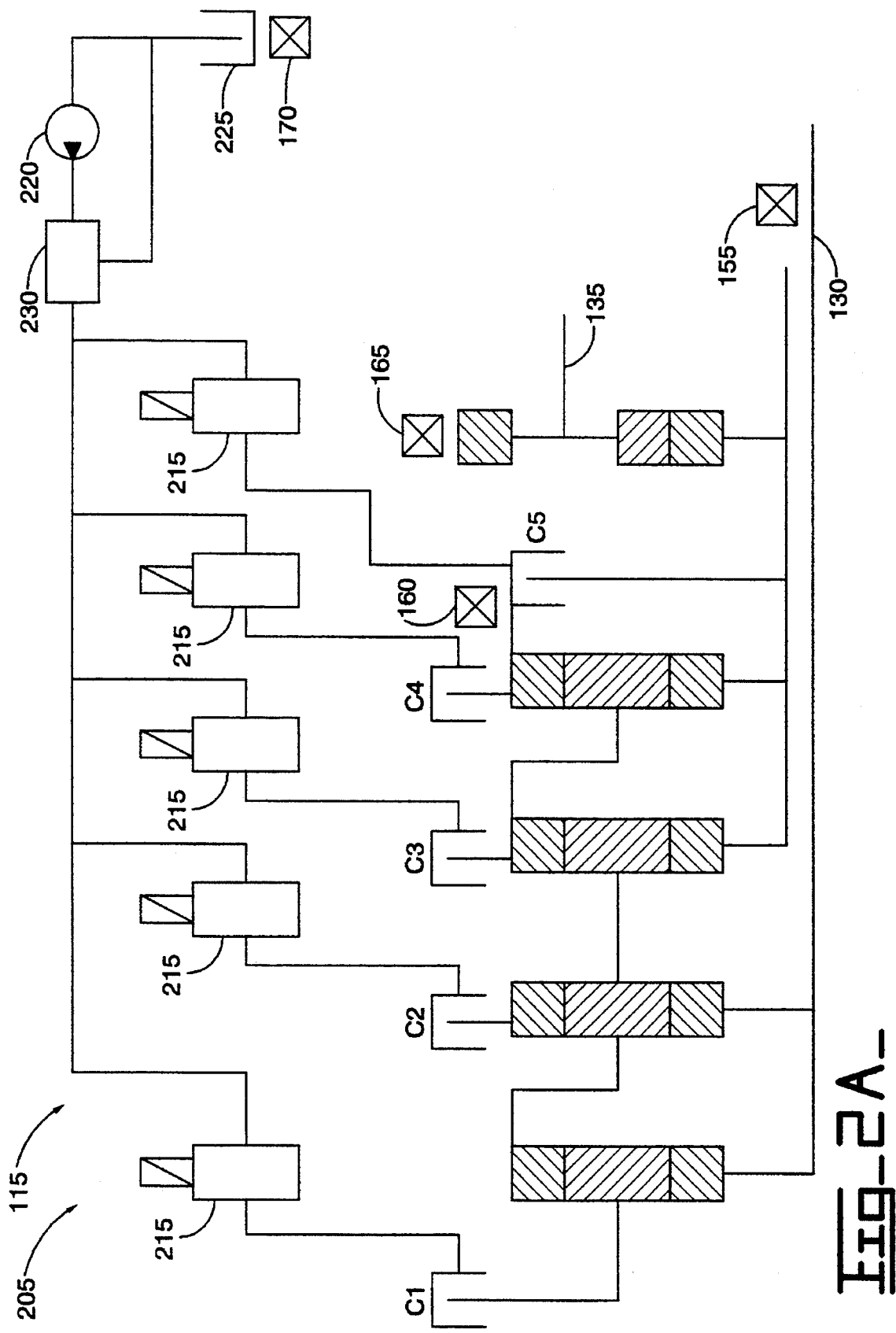

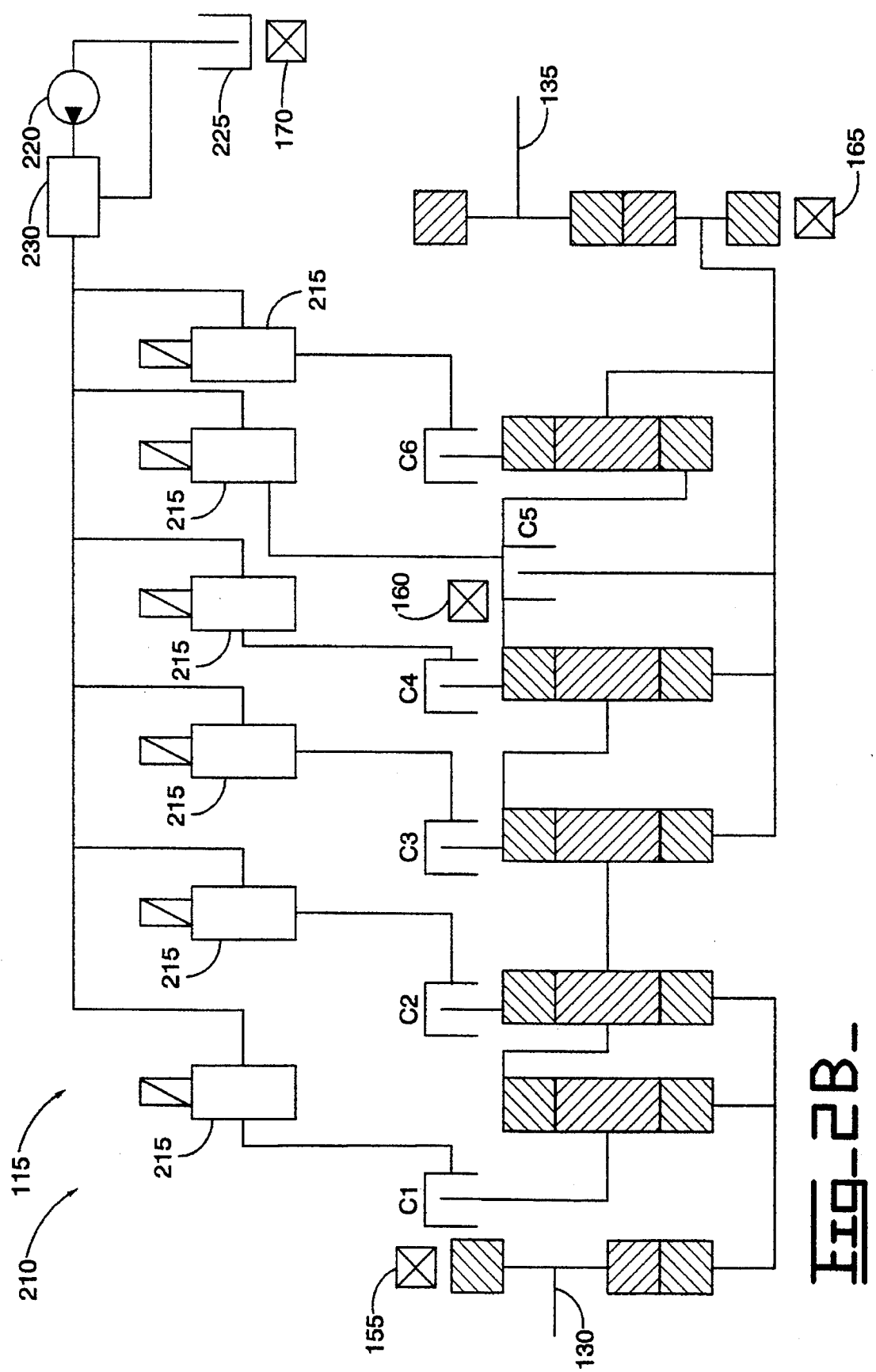
Fig_2B_

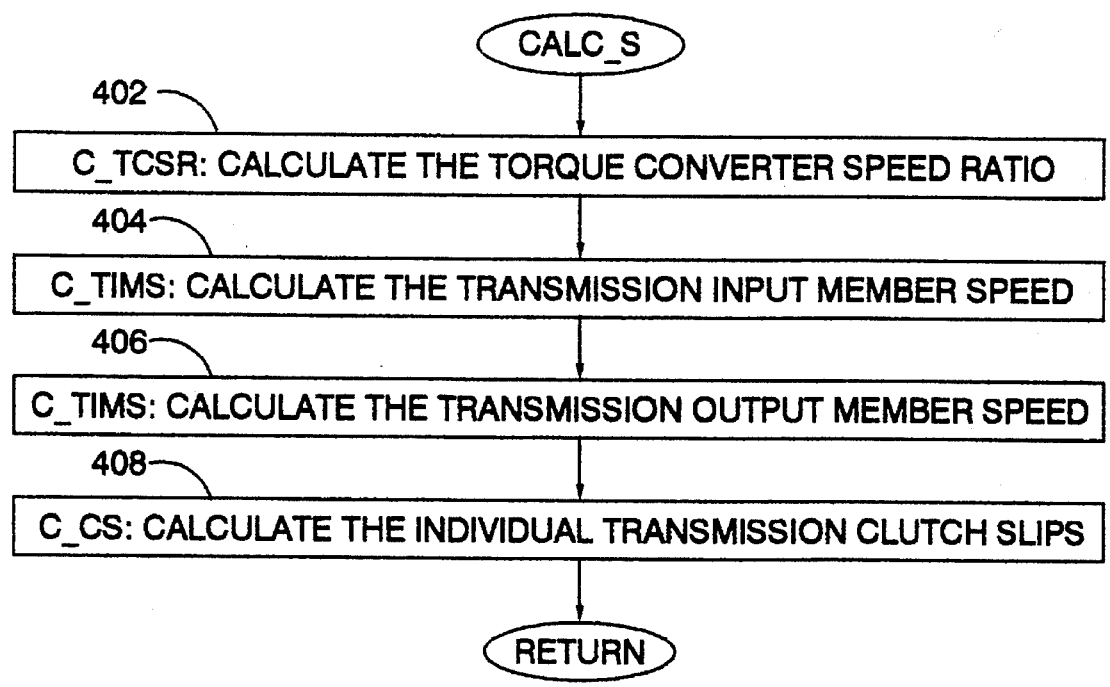
Fig-4-

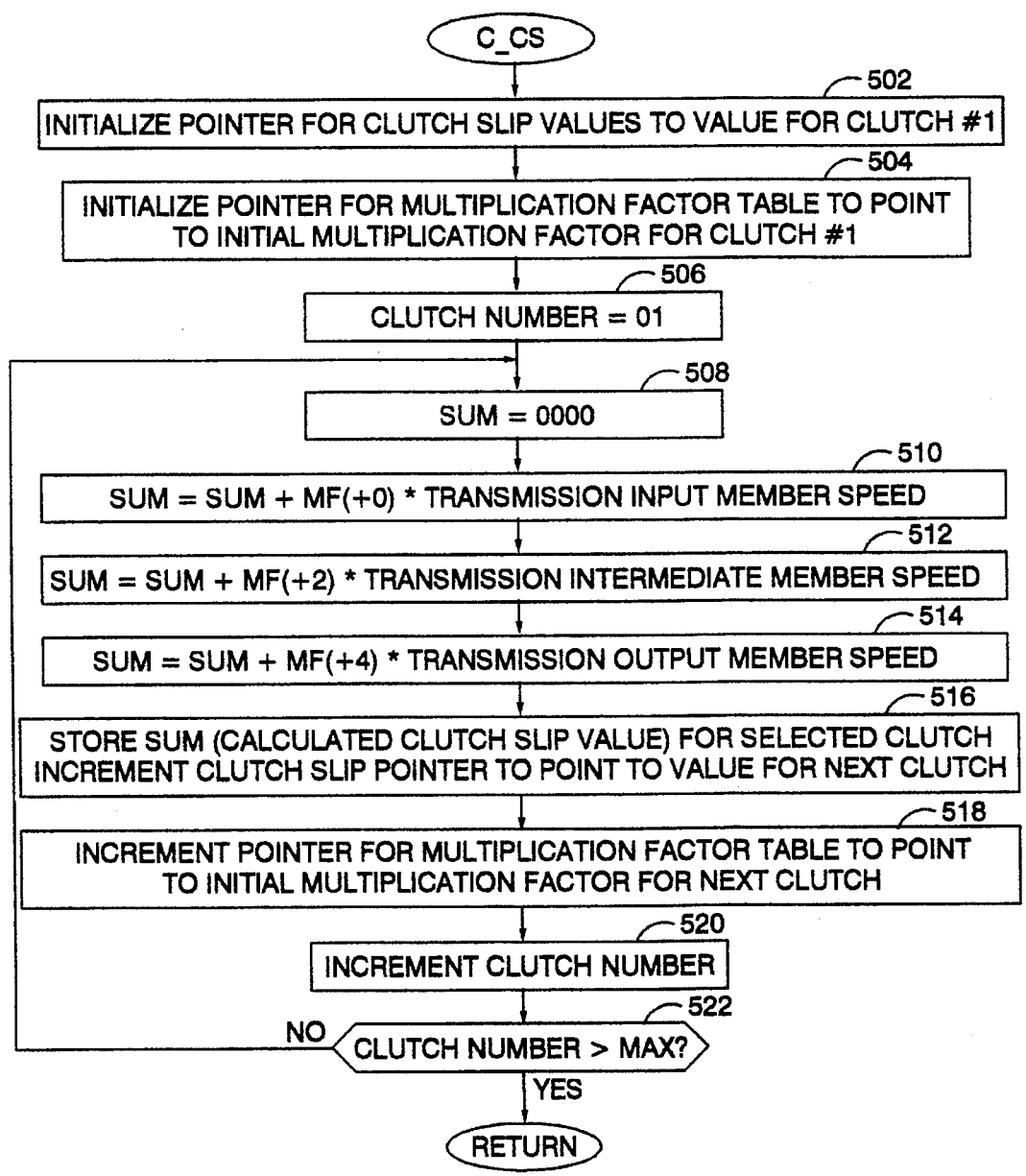
Fig_5_

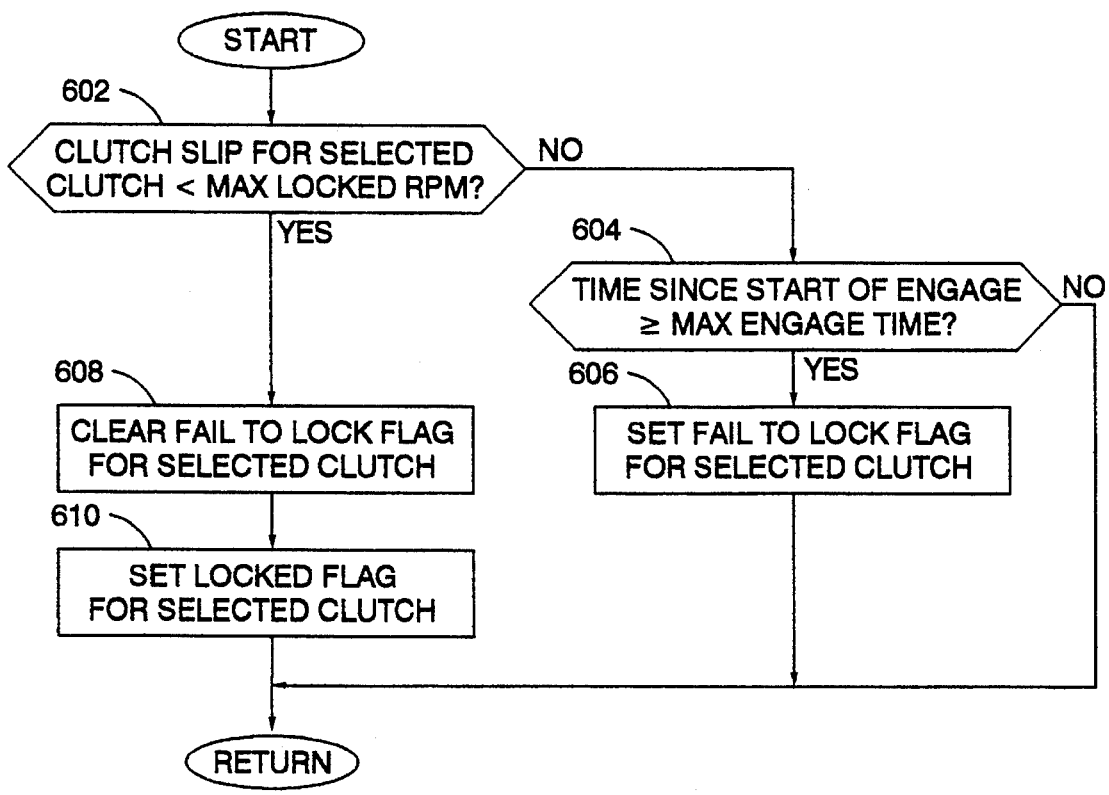
Fig_6_

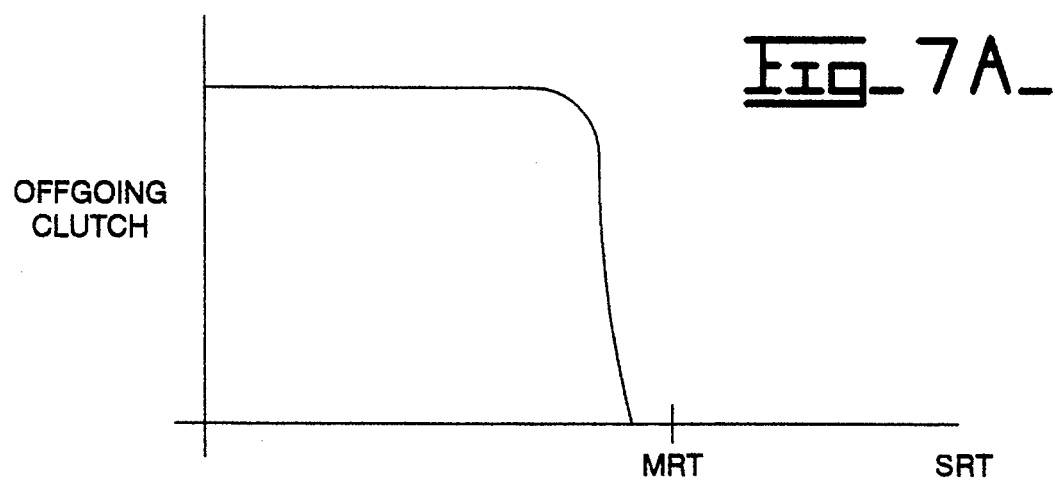
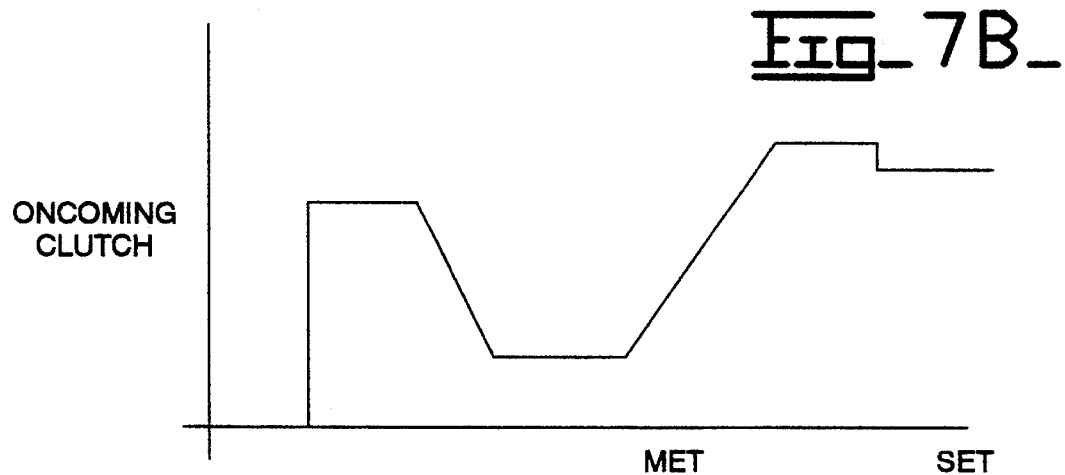
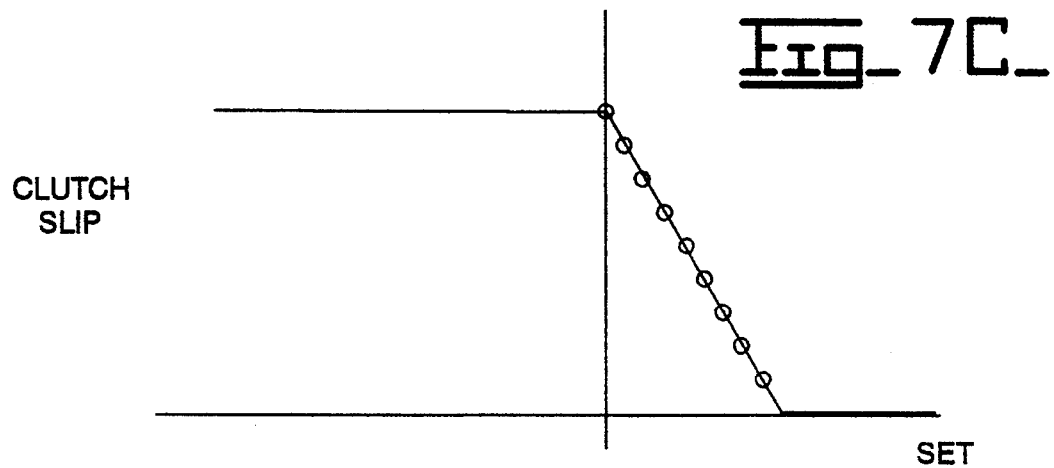

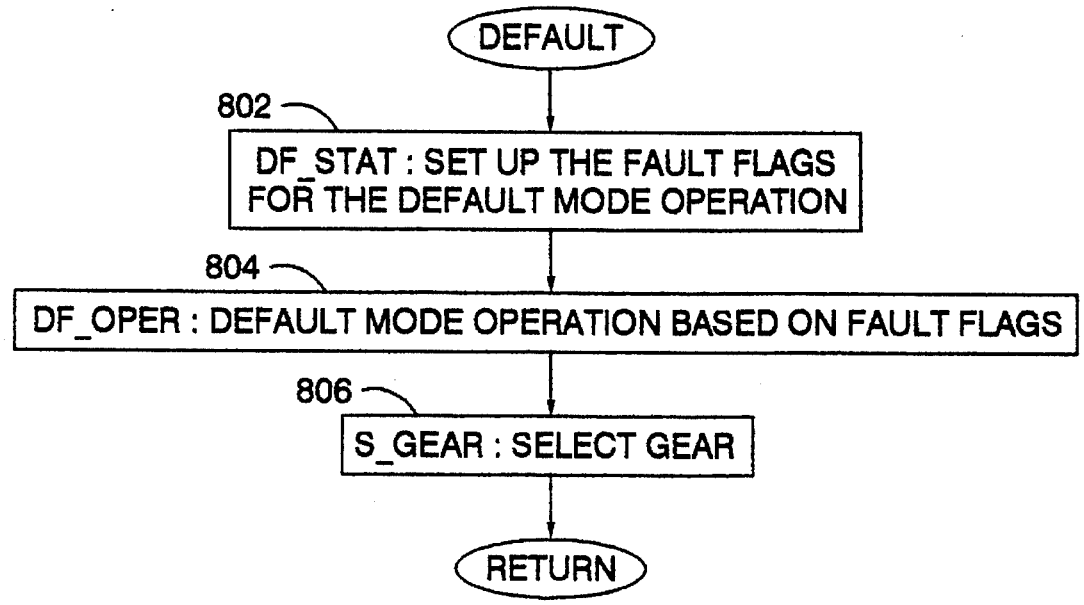
Fig_8_
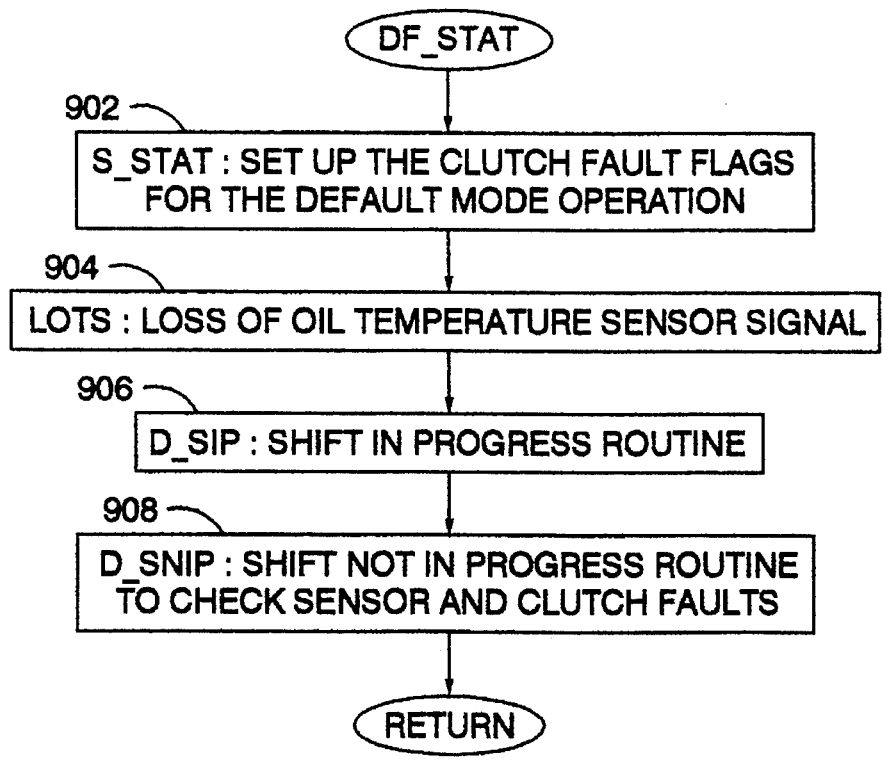
Fig_9_

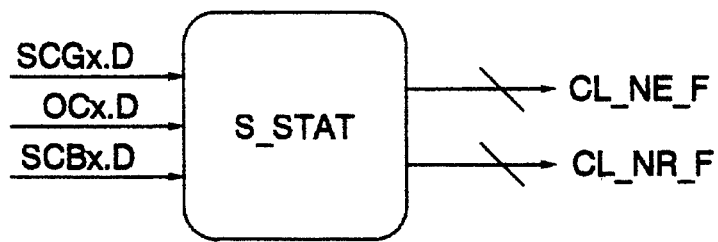
Fig_10_
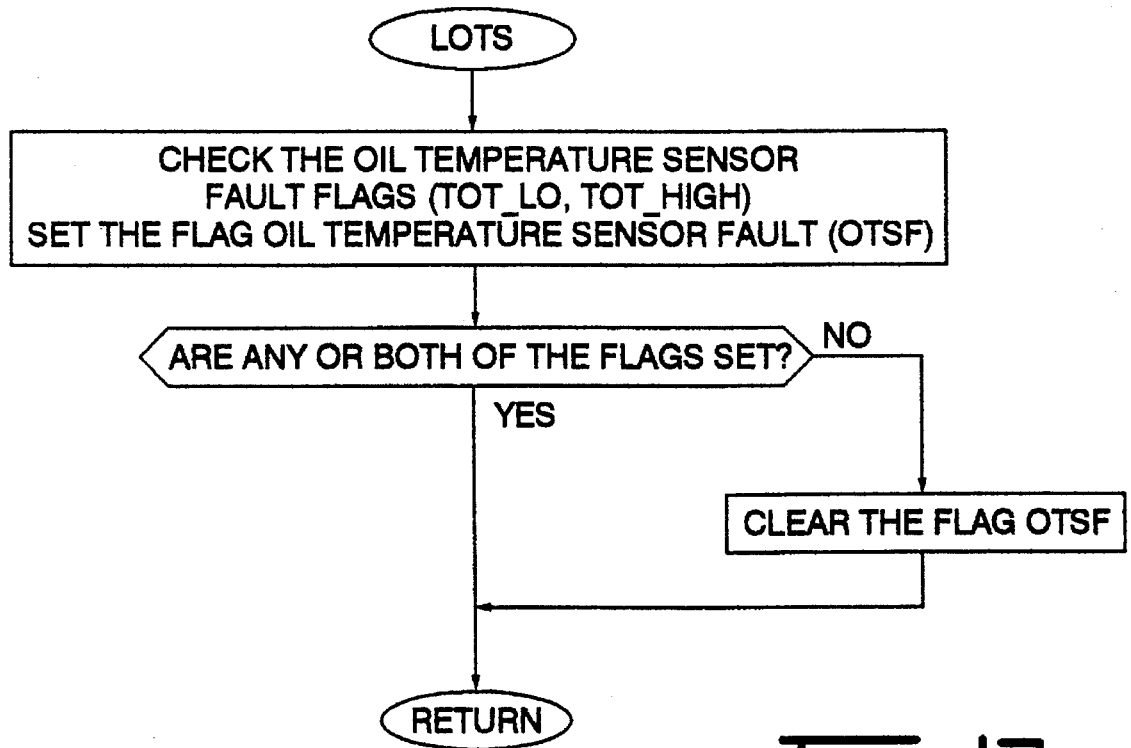
Fig_12_

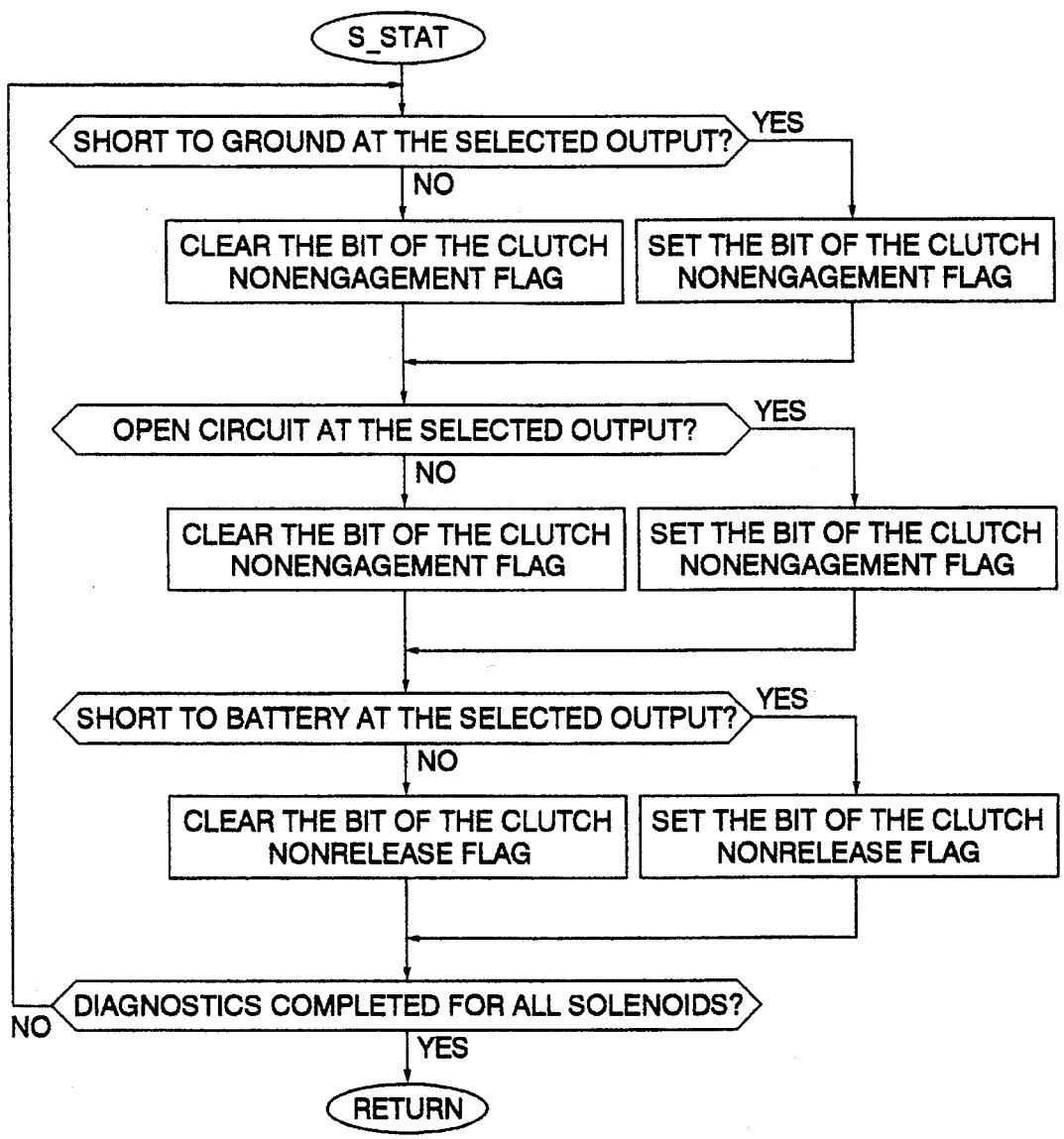
Fig_11_

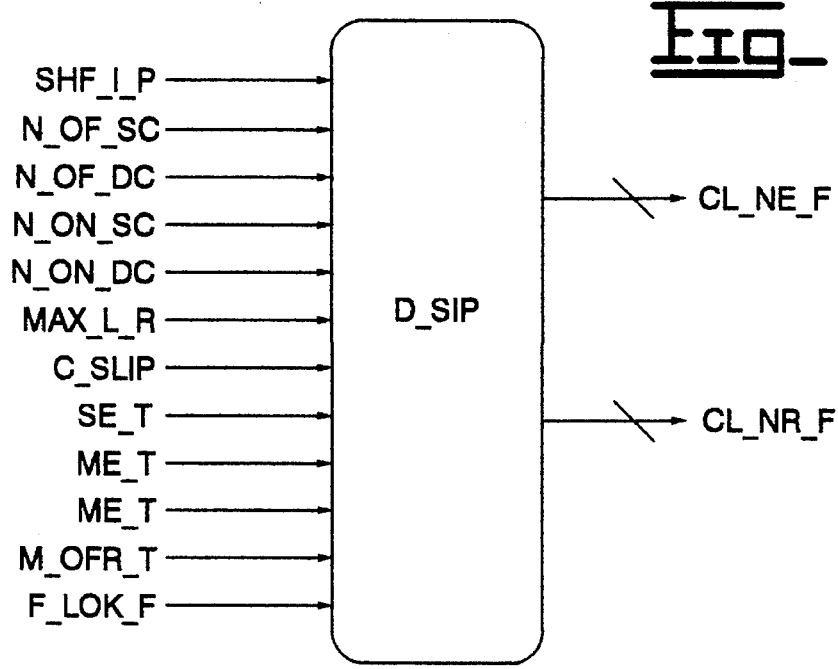
Fig_13_
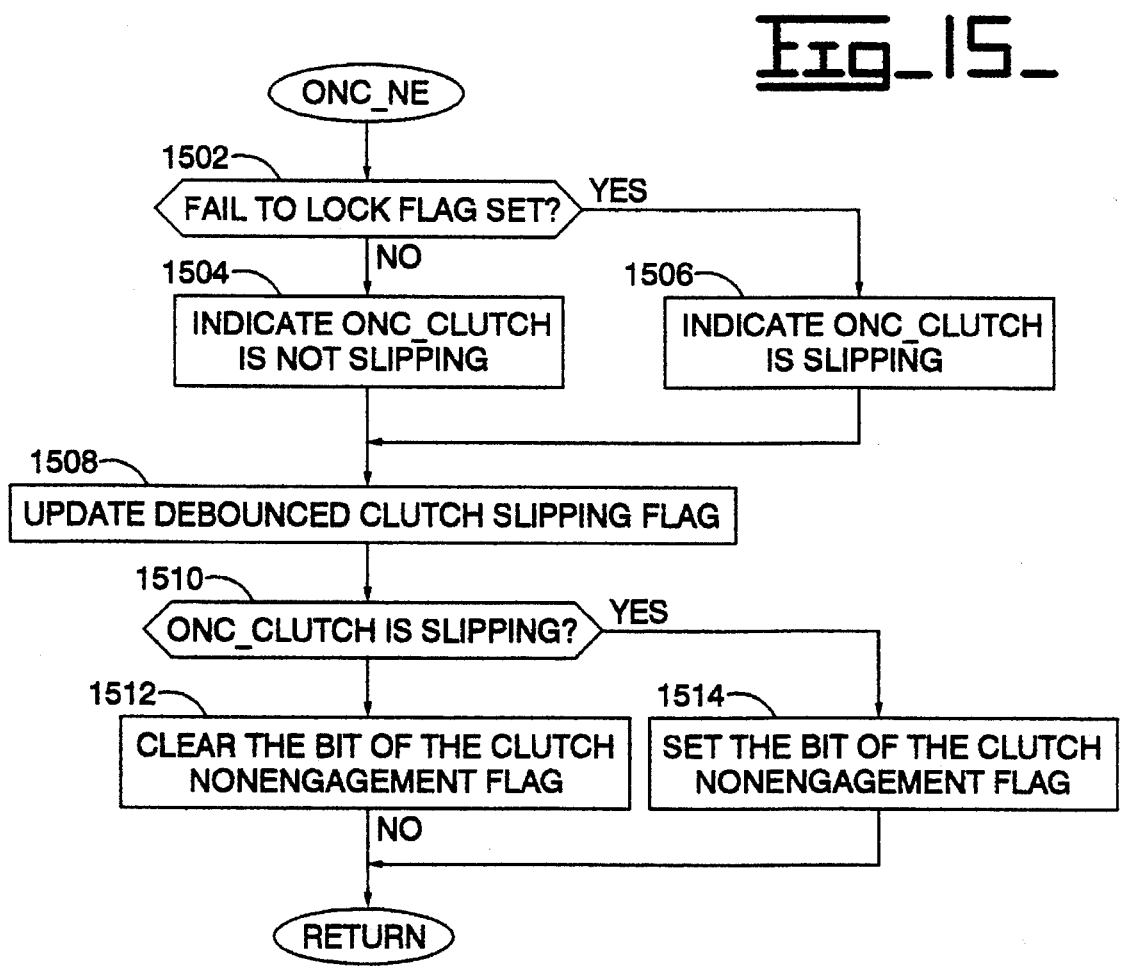
Fig_15_

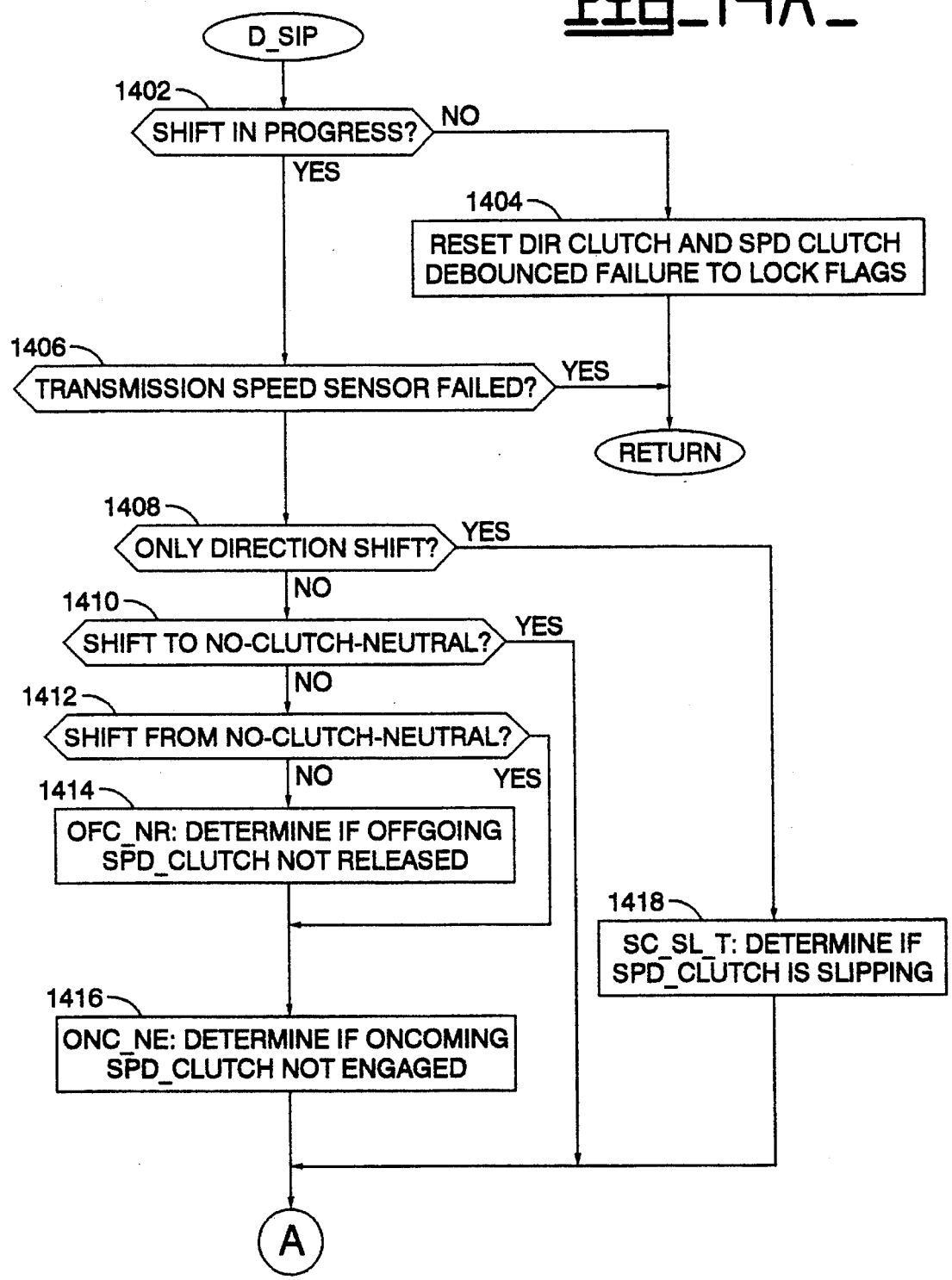
Fig_14A_

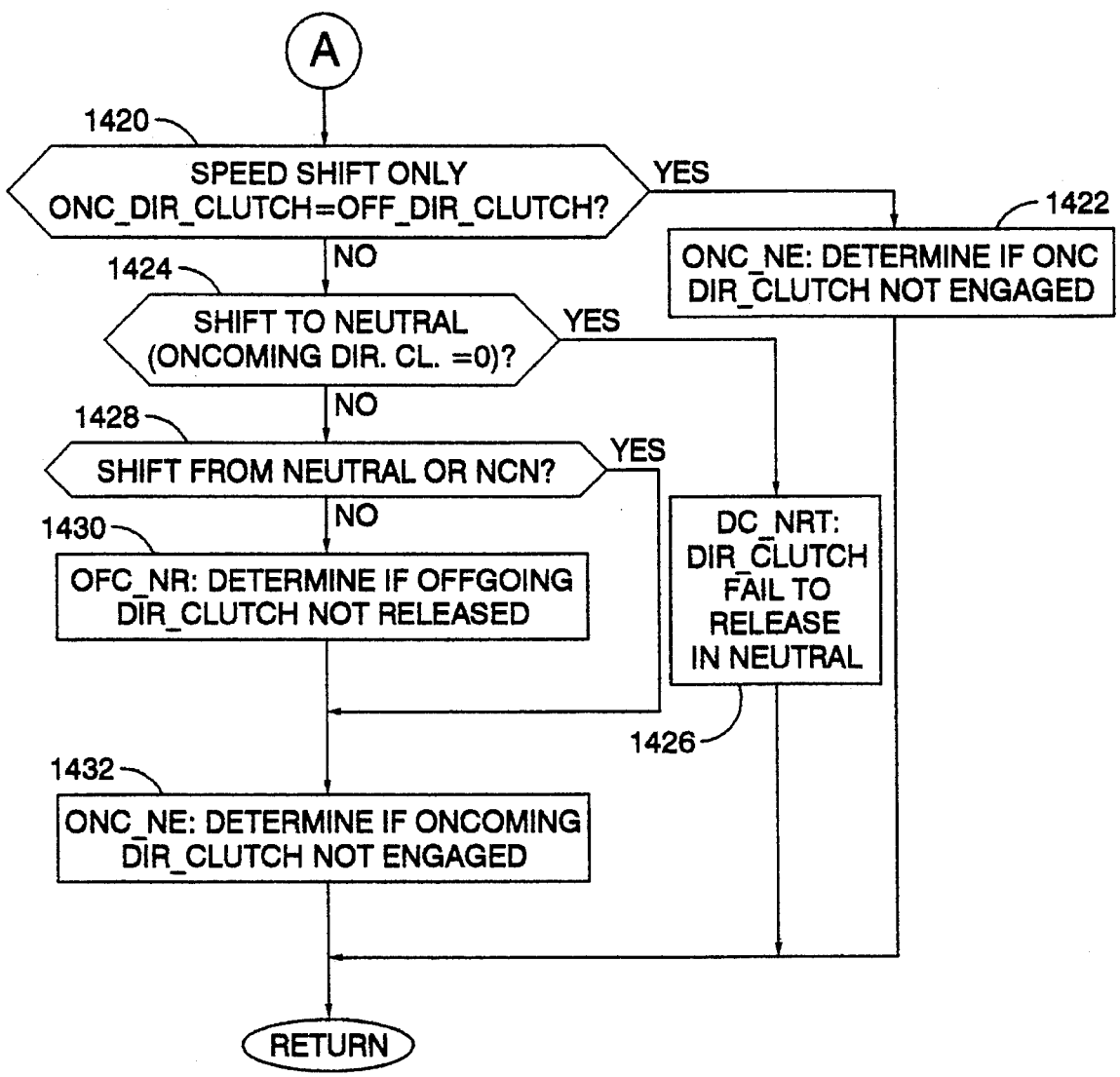
Fig_14B_

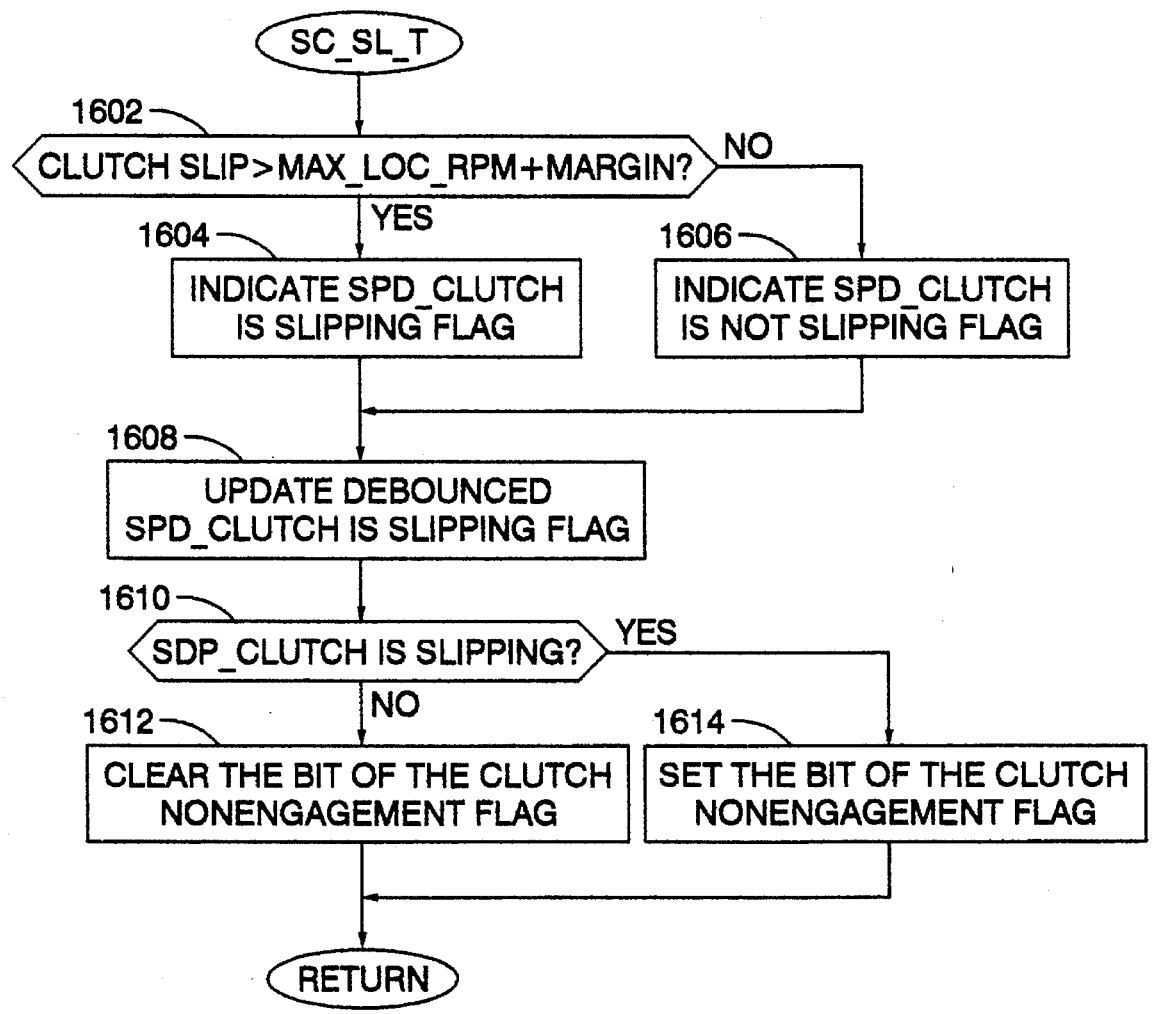
Fig_1b_

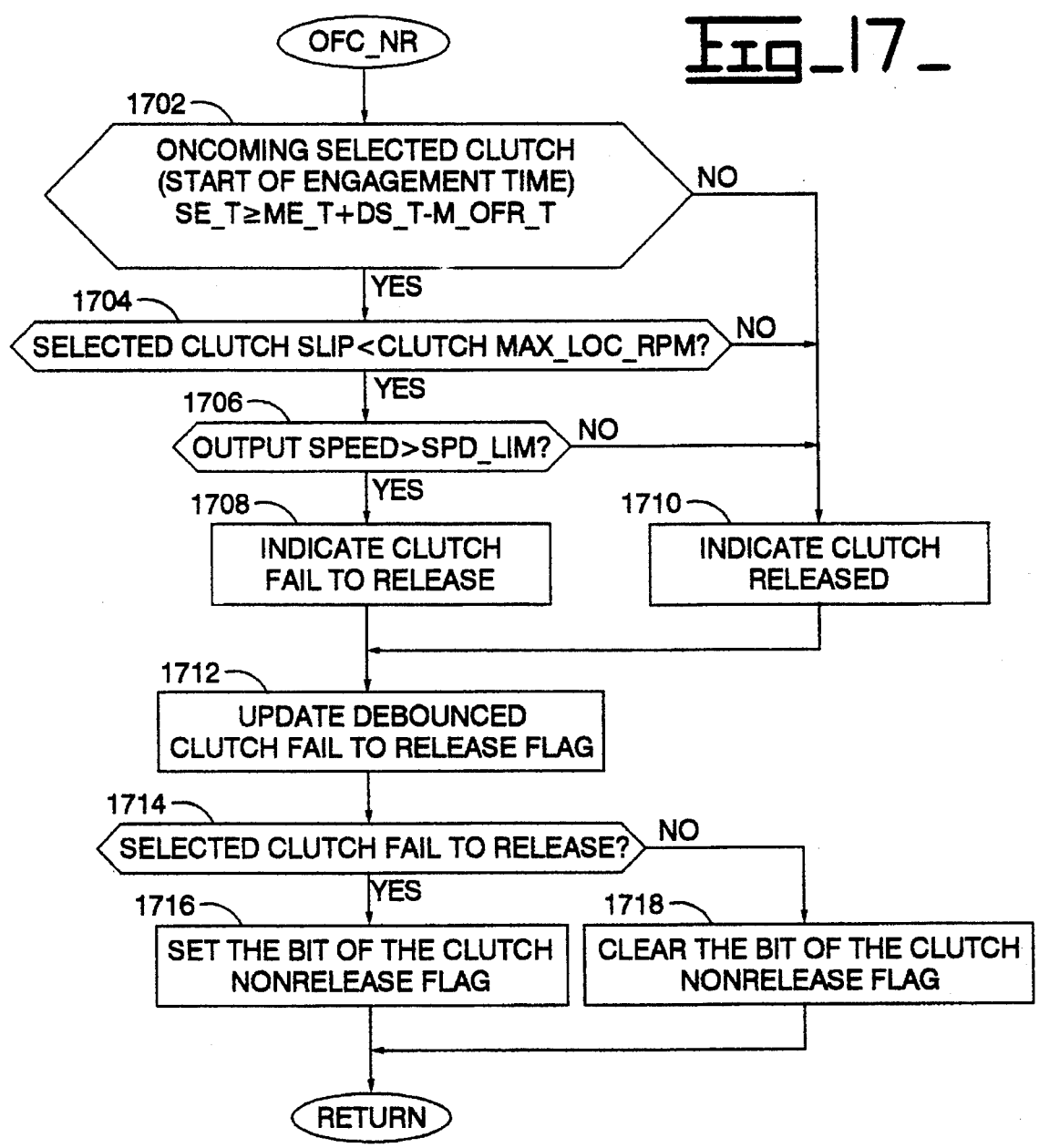
Fig_17_
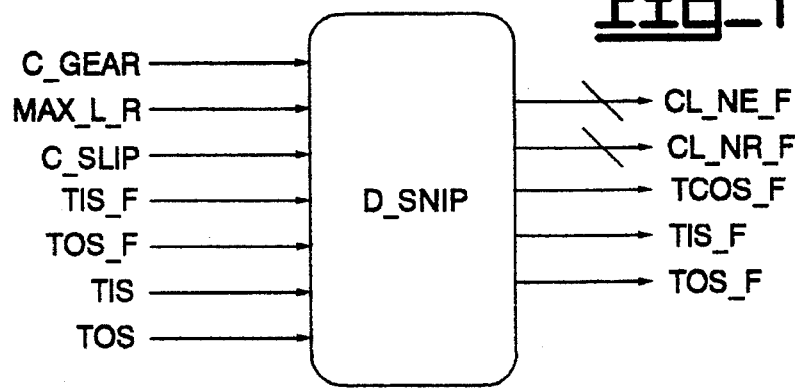
Fig_18_

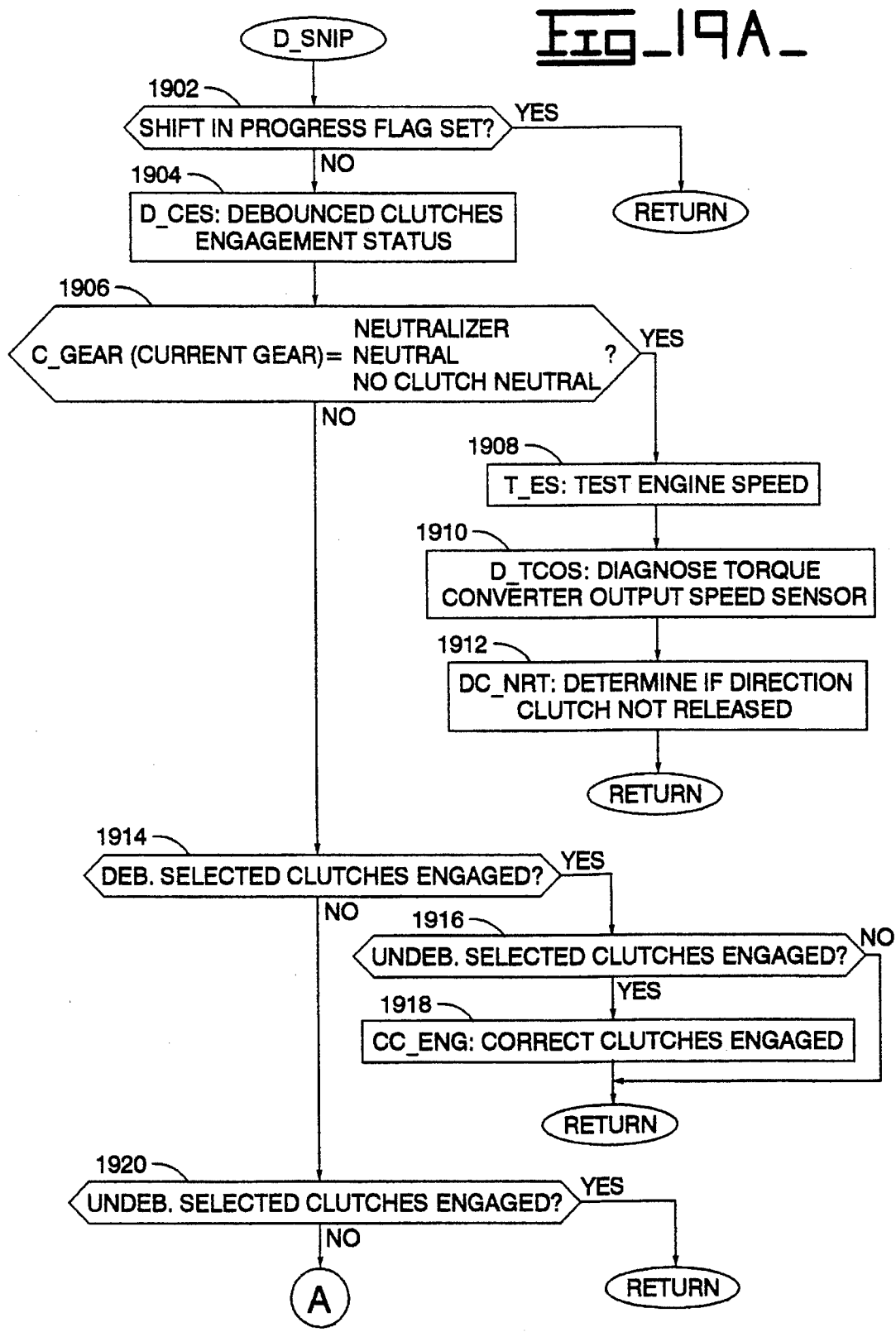
Fig_19A_

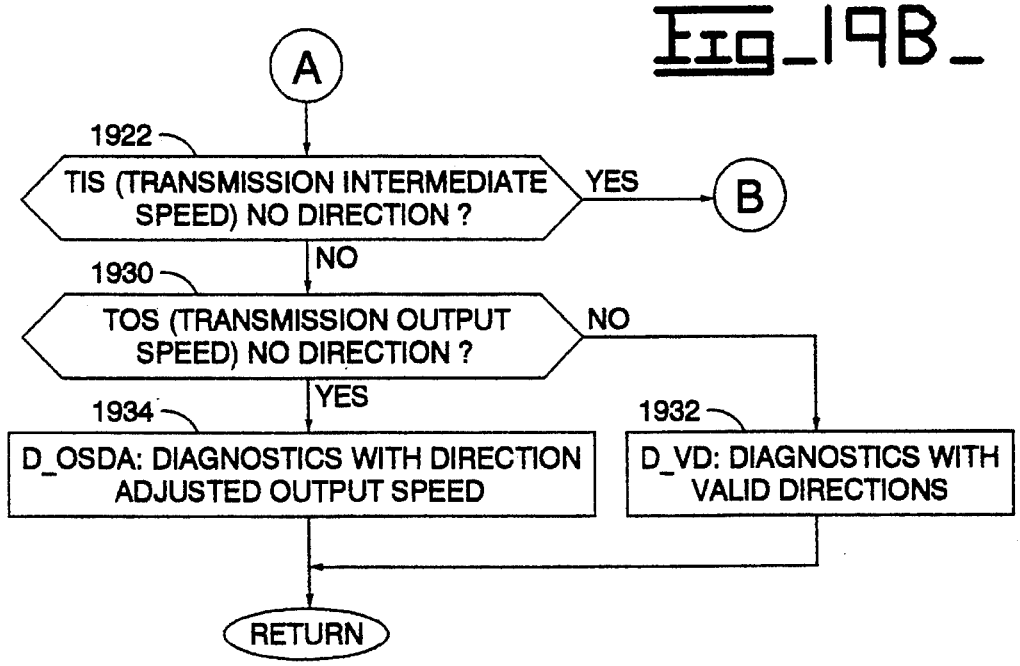
Fig_19B_
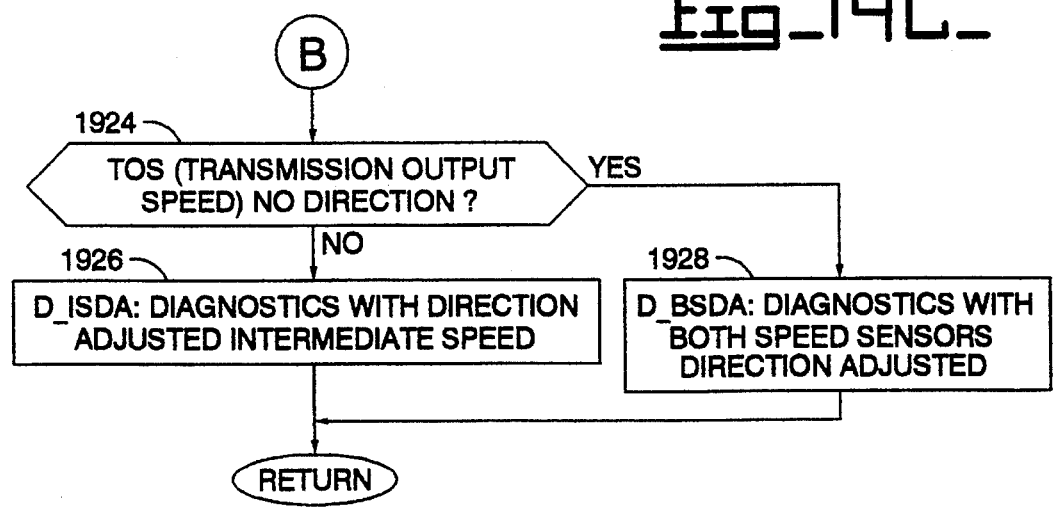
Fig_19C_

Fig_21_

Fig_22_

Fig_23_

Fig_25_

Fig_26_

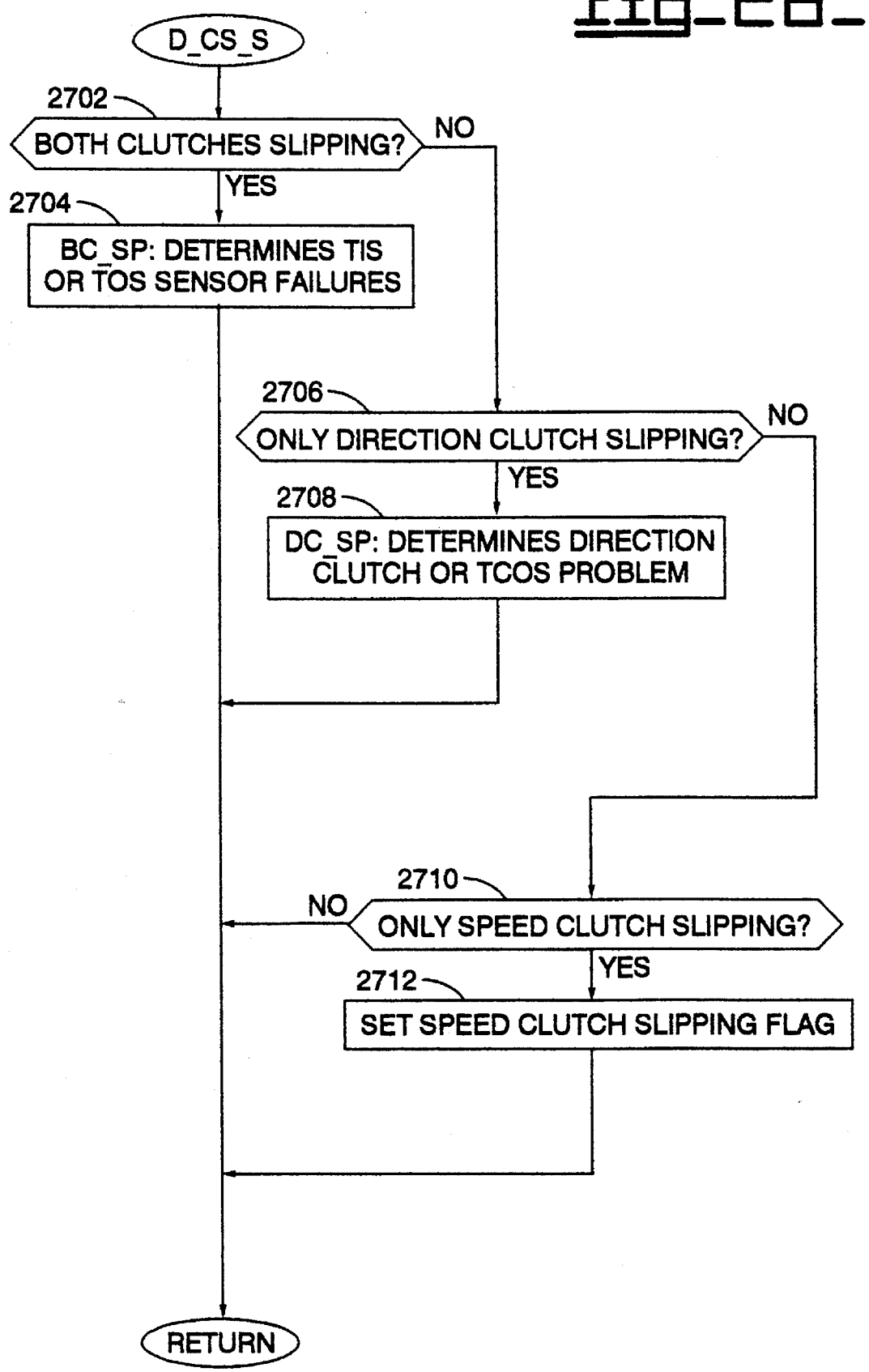
Fig_28_

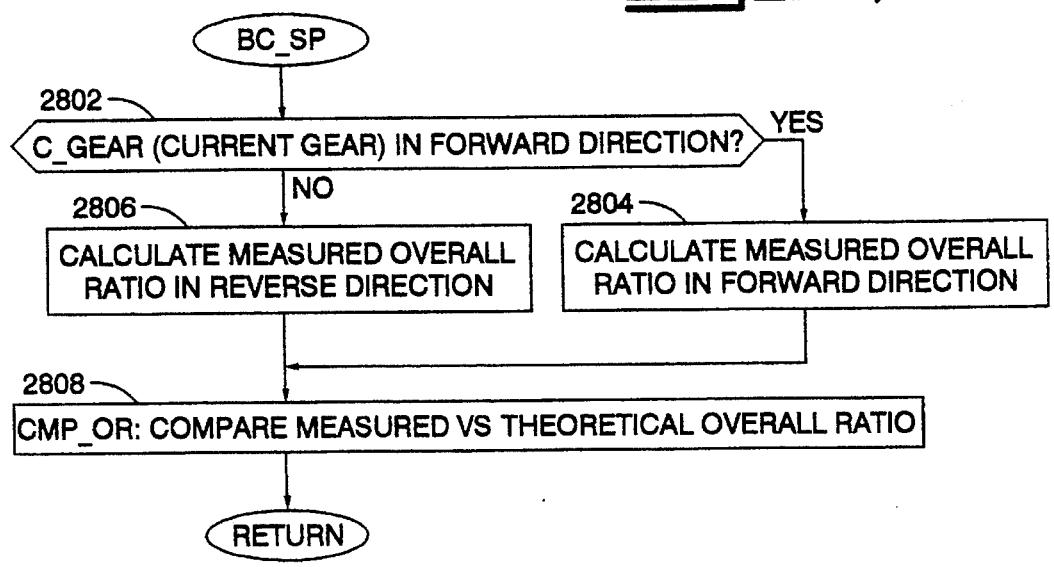
Fig_29_
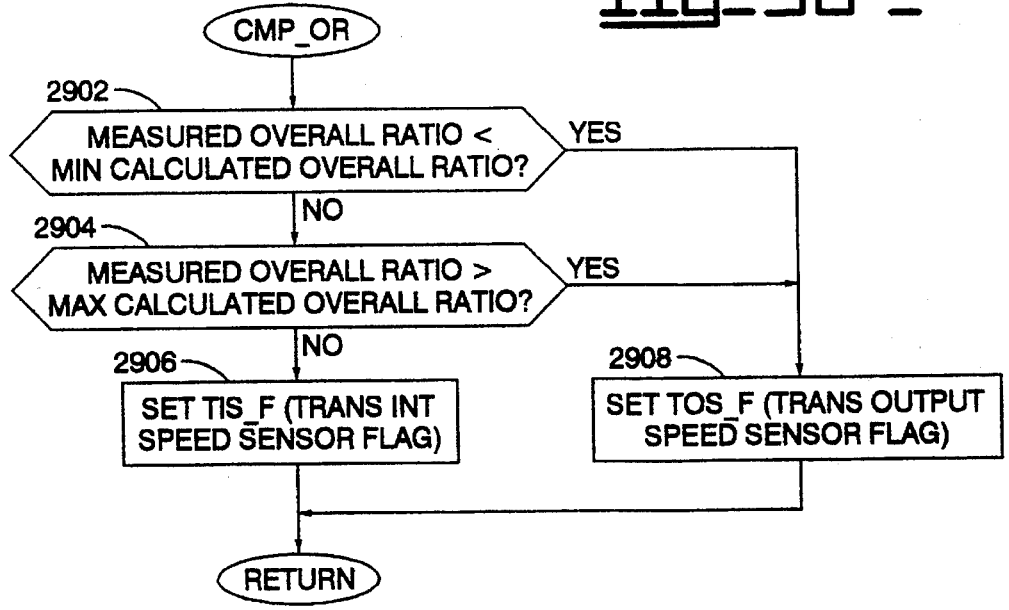
Fig_30_

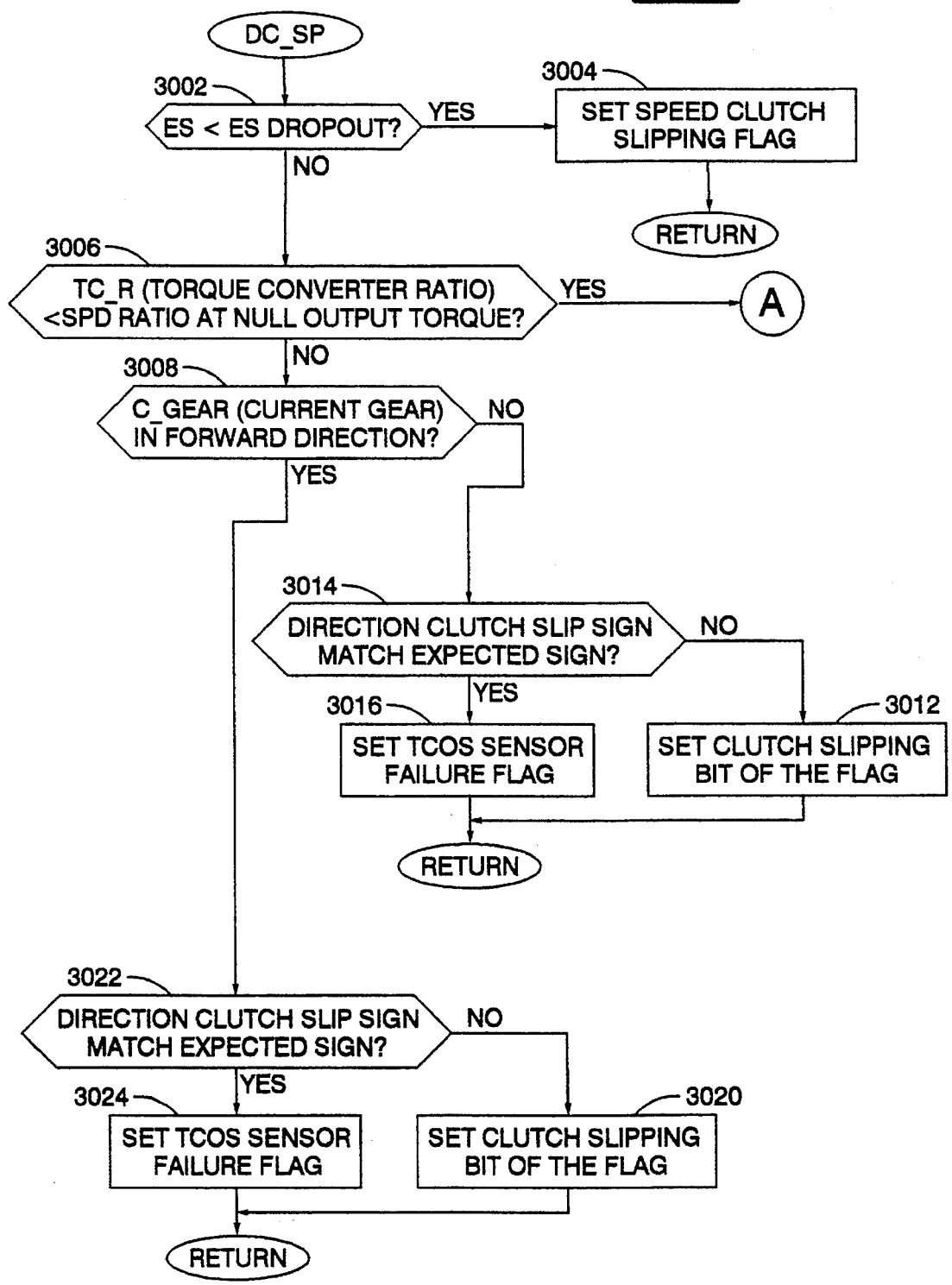
Fig_31A_

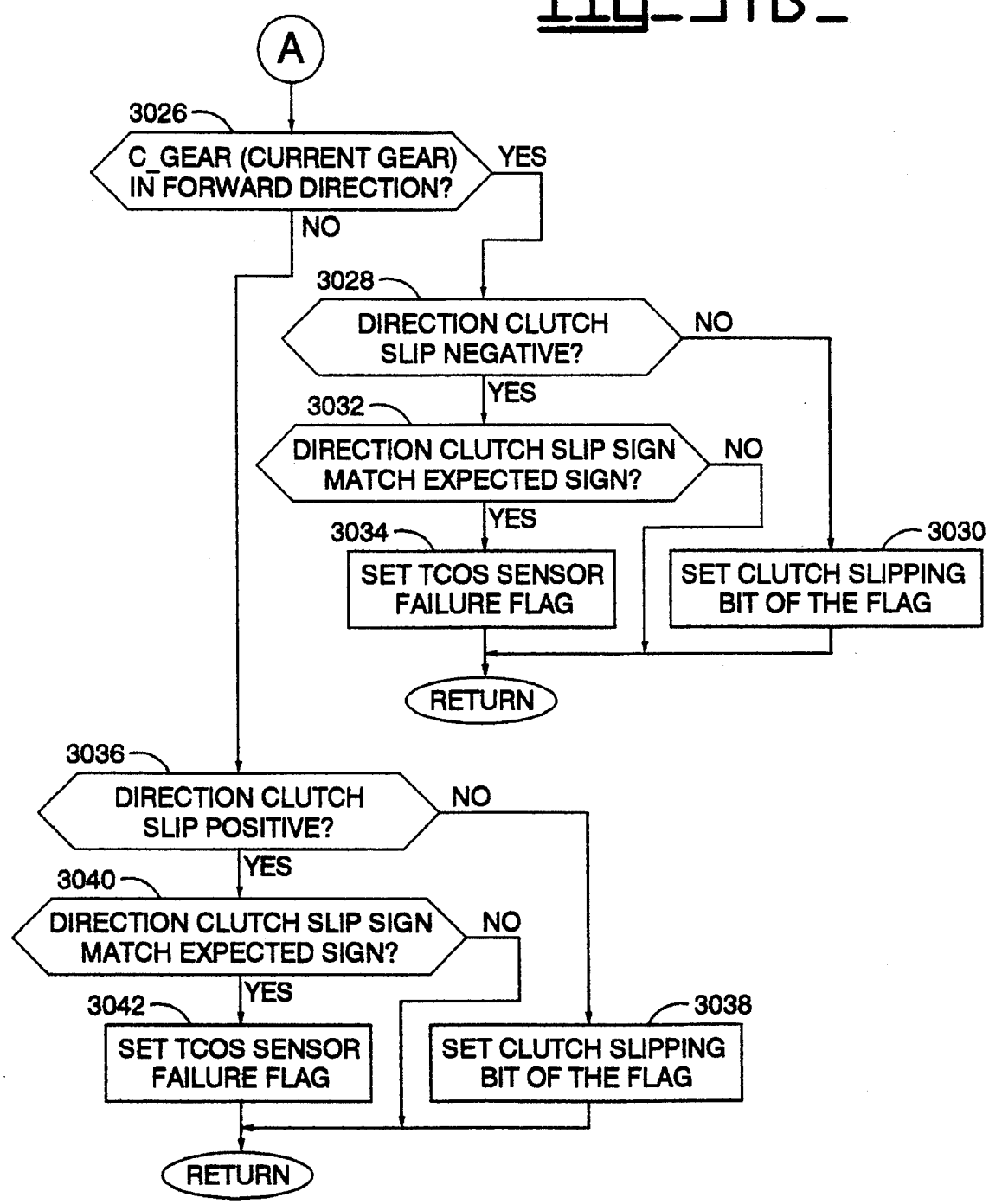
Fig_31B_

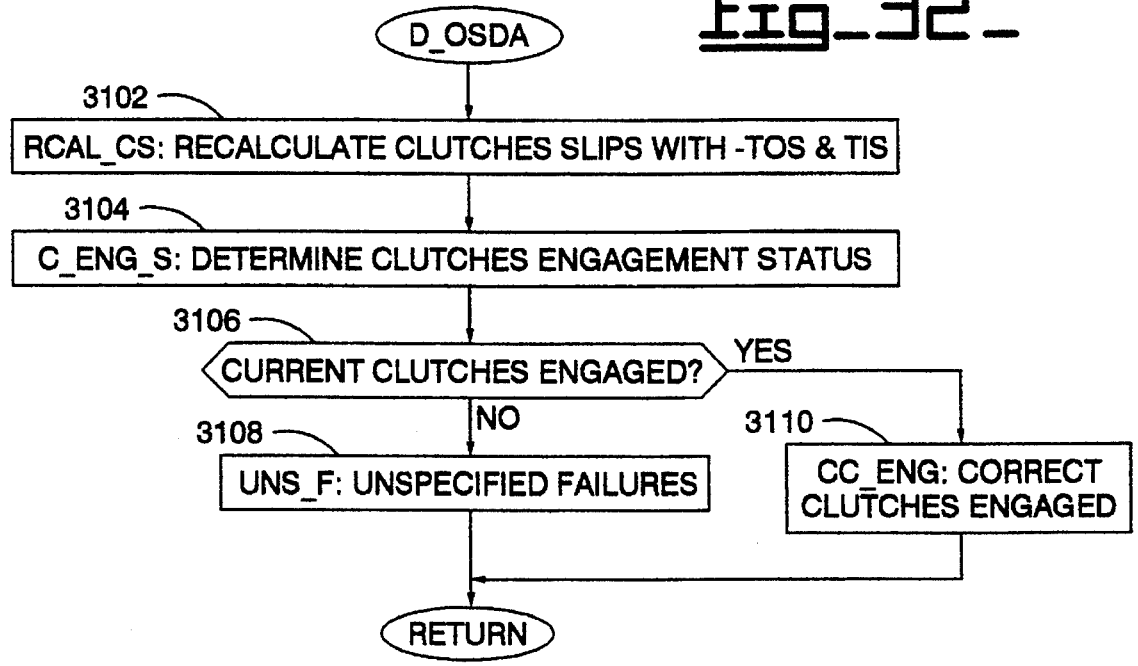
Fig_32_
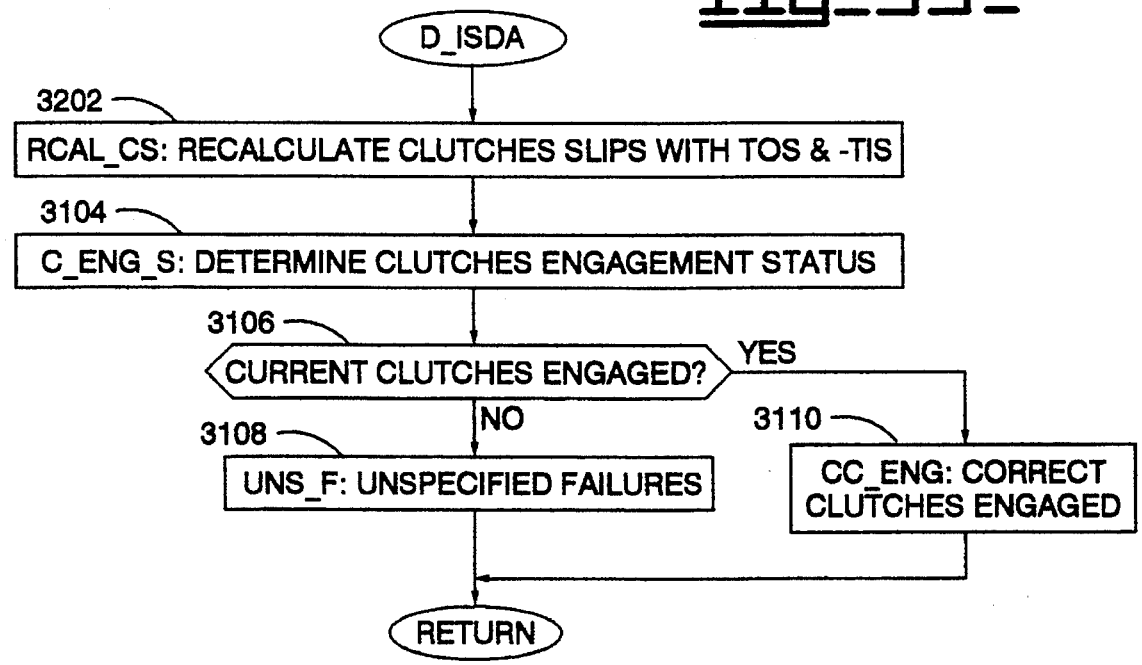
Fig_33_

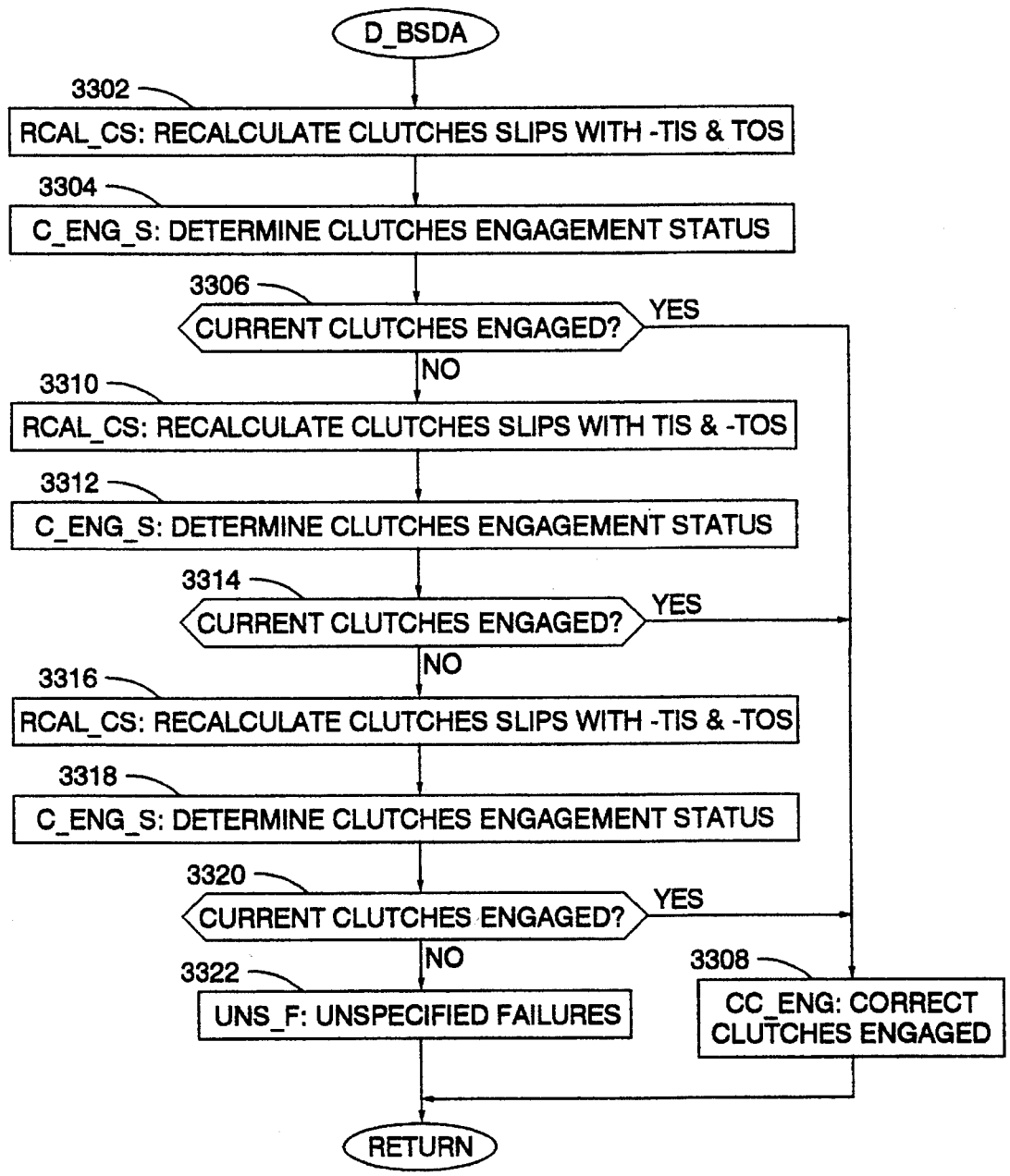
Fig_34_

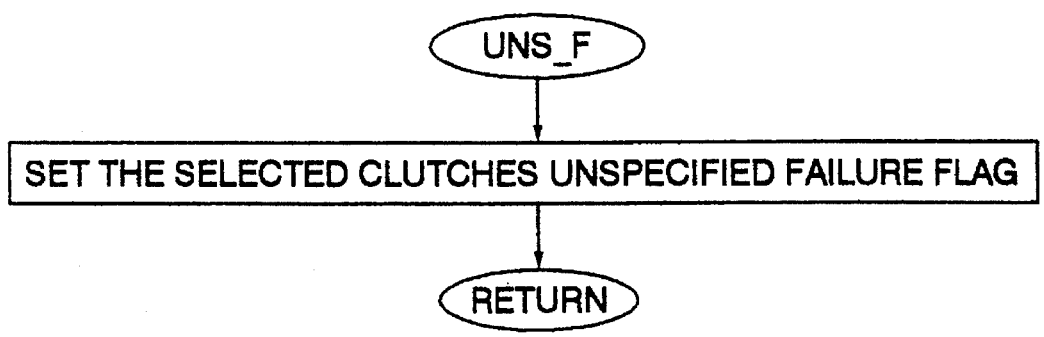
Fig_35_
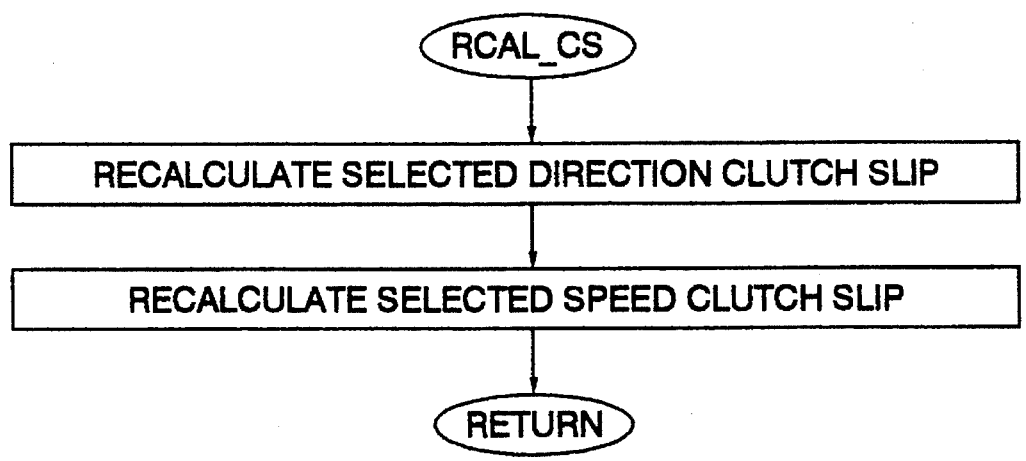
Fig_36_

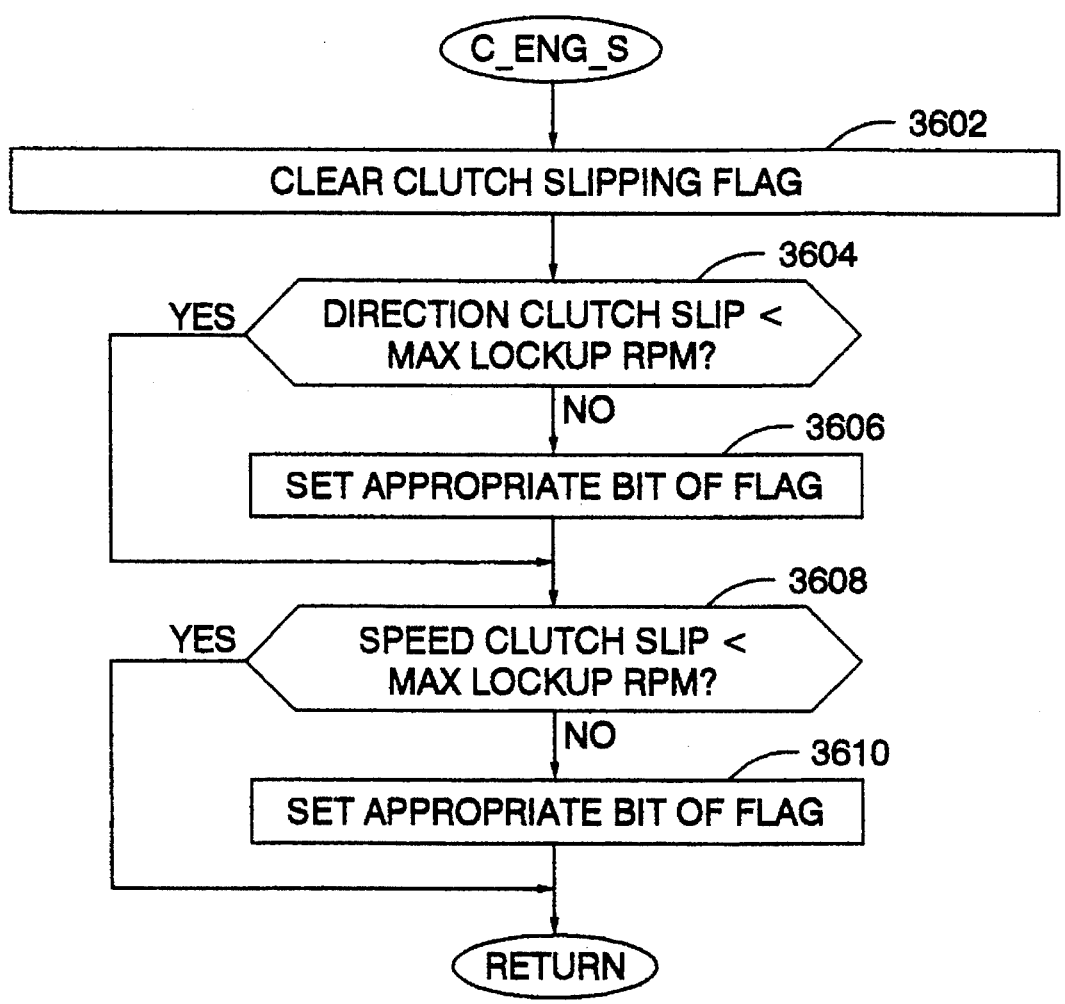
Fig_37_

5,609,067

TRANSMISSION CONTROL FAULT DETECTION

TECHNICAL FIELD

This invention relates generally to a transmission and, more particularly, to a method and apparatus of detecting fault conditions in a powershift transmission.

BACKGROUND ART

Generally, a motor vehicle powershift transmission includes a number of gear elements coupling the input and output shafts, and a related number of clutches that are selectively engageable to activate gear elements for establishing a desired speed ratio between the input and output shafts. The clutch may be of the band or disk type.

For example, the input shaft may be connected to the engine through a fluid coupling, such as a torque converter, and the output shaft is connected directly to the vehicle drive. Shifting from one gear ratio to another involves releasing or disengaging the off-going clutches associated with the current gear ratio and applying or engaging the oncoming clutches associated with the desired gear ratio by controllably actuating and deactuating a plurality of solenoid actuators.

Transmissions of this type are often electronically controlled and include diagnostic functions for determining when a fault condition exists. For example, diagnostic systems can sense electrical problems in the control solenoids. A system of this type is illustrated in U.S. Pat. No. 4,414,863 issued Nov. 15, 1983 to Heino. Diagnostic systems have also been developed to sense mechanical problems, such as clutch non-engagement, in response to sensing clutch pressure. A system of this type is illustrated in U.S. Pat. No. 5,174,137 issued Dec. 29, 1992 to Kato et al. While systems of this type are operable, pressure sensors or switches are often unreliable and expensive. Similarly, systems of this type include not only pressure sensors, but also input, intermediate, and output speed sensors.

The present invention is directed to overcoming one or more of the problems as set forth above.

DISCLOSURE OF THE INVENTION

The present invention provides diagnostic information for a transmission without the need for expensive and unreliable pressure sensors and integrates mechanical and electrical fault diagnosis in an electronically controlled transmission. Mechanical failures and many sensor problems are diagnosed by determining clutch engagement status in response to the output signals of a plurality of rotational speed sensors.

In one aspect of the present invention, a diagnostic system is provided for detecting a fault condition in a transmission having a plurality of rotating components, a plurality of clutches, and a transmission control. The diagnostic system includes speed sensors producing speed and direction signals representative of the rotational velocity of the rotating components, a processor for calculating the relative rotational speed between two or more clutches and for indicating a fault condition in response to the relative rotational speed and a period of time.

In a second aspect of the invention, a diagnostic system is provided for detecting a fault condition in a transmission. The diagnostic system includes speed sensors producing speed and direction signals and a processor for calculating a relative rotational speed between two or more clutches, for determining a first clutch engagement status in response to the relative rotational speed, and for reversing the direction signal of at least one of the speed sensors and determining a second clutch engagement status using the reversed direction signal.

In another aspect of the invention, a diagnostic system is provided for detecting a fault condition in a transmission having a plurality of rotating components, and a plurality of clutches. The diagnostic system includes speed sensors producing speed and direction signals in response to the rotational speed of the rotating components and a processor for calculating a relative rotational velocity between two or more clutches, for calculating a torque converter ratio and comparing the torque converter ratio to a predetermined constant, and for determining whether a direction clutch is slipping or a torque converter output sensor signal is incorrect in response to the relative rotational velocity and the comparison of the torque converter ratio to the predetermined constant.

In another aspect of the invention, a method is provided for detecting a fault condition in a transmission having a plurality of rotating components, a plurality of clutches, and a transmission control. The method includes the steps of producing speed and direction signals in response to the rotational speed of a plurality of the rotating components; calculating the relative rotational speed between two or more clutches; and indicating a fault condition in response to the relative rotational speed and a period of time.

In another aspect of the invention, a method is provided for detecting a fault condition in a transmission having a plurality of rotating components, and a plurality of clutches. The method includes the steps of producing speed and direction signals in response to the rotational speed of a plurality of the rotating components; calculating a relative rotational speed between two or more clutches; determining a first clutch engagement status in response to the relative rotational speed; reversing one of the direction signals and determining a second clutch engagement status using the reversed direction signal.

BRIEF DESCRIPTION OF THE DRAWINGS

For a better understanding of the present invention, reference may be made to the accompanying drawings in which.

FIG. 1 is a block diagram of an electronic control system of a vehicle drive train including a transmission;

FIGS. 2A,B are block diagrams illustrating respective embodiments of a transmission configuration;

FIG. 4 thorough 6 illustrate algorithms executed in connection with the invention;

FIG. 7 illustrates clutch commands and clutch slip during a gear shift in a powershift transmission; and FIGS. 8 through 37 illustrate algorithms executed in connection with the invention.

BEST MODE FOR CARRYING OUT THE INVENTION

Figure 3:
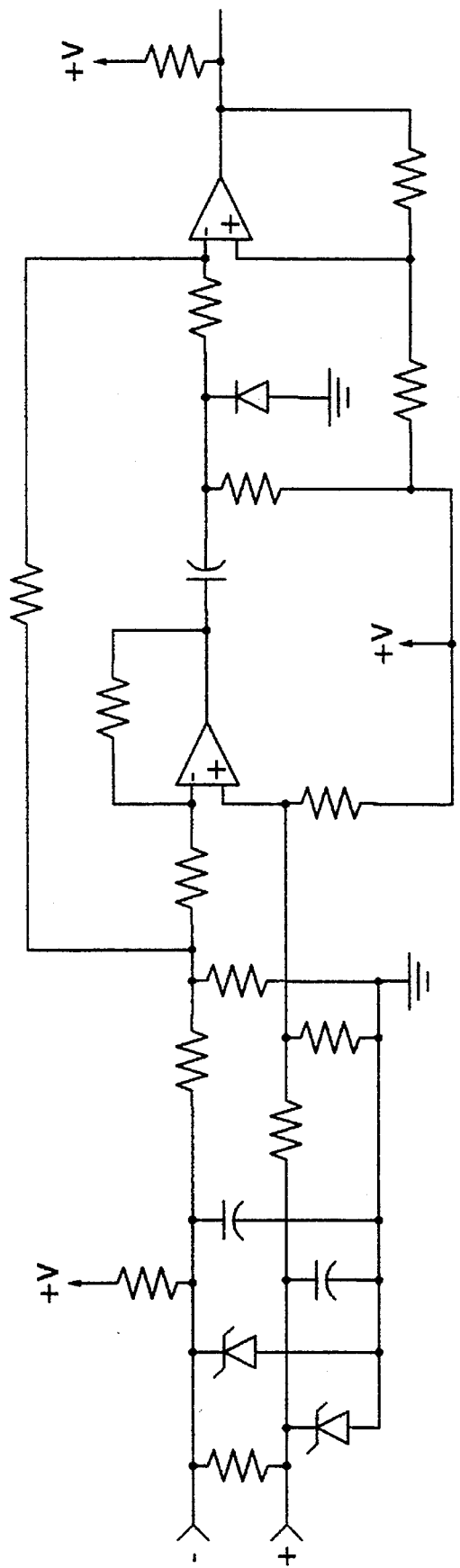
FIG. 3 is a schematic of a circuit used in connection with a speed sensor.

FIG. 1 illustrates an electronic control system of a power train 100 that includes an internal combustion engine 105, a fluidic torque converter 110, a multi-speed fluid operated power transmission 115, and a vehicle drive train 120. The engine 105 is connected to the torque converter 110 via shaft 125, the torque converter 110 is connected to the transmission 115 via shaft 130, and transmission 115 is connected to the vehicle drive 120 via shaft 135.

Referring now to FIGS. 2A,2B, a block diagram of two transmission gear sets are shown. For example, FIG. 2A represents a track-type tractor transmission gear set 205, and FIG. 2B represents a wheeled vehicle transmission gear set 210. The transmission of FIG. 2A includes five clutches, where C1 is a reverse direction clutch, C2 is a forward direction clutch and clutches C3–C5 are speed clutches. The transmission of FIG. 2B includes six clutches, where C1 is a reverse direction clutch, C2 is a forward direction clutch and clutches C3–C6 are speed clutches. Gear shifts are accomplished by selectively engaging and disengaging combinations of the clutches. The clutches are actuated by hydraulic pressure and upon engagement, require fill time before torque is transmitted between a driving and a driven friction element. That is, the fill time is the elapsed time that the clutch piston moves from the released to the engaged position. The clutches are selectively engaged and disengaged by solenoid operated proportional pressure control valves 215. The hydraulic circuit of the transmission includes a positive displacement pump 220 that supplies pressurized hydraulic fluid from the sump or reservoir 225 to the clutches through the control valves 215. Moreover, a relief valve 230 may be added to regulate the valve supply pressure.

Referring back to FIG. 1, the control portion of the power train will now be discussed. An operator initiates a desired shift via an operator shift handle 140, which produces a gear selection signal. An electronic control module 147 receives the gear selection signal and responsively controls the operation of the solenoid control valves 215. The electronic control module 147 may also receive various other input signals representative of vehicle system parameters. Such other inputs signals may include a neutralizing signal from a neutralizer pedal 145, an engine speed signal from an engine speed sensor 150, a transmission input speed signal, in the preferred case a torque converter output speed signal, TCOS, from a transmission input speed sensor 155, a transmission intermediate speed signal, TIS, from a transmission intermediate speed sensor 160, a transmission output speed signal, TOS, from a transmission output speed sensor 165, and a transmission oil temperature signal from a transmission oil temperature sensor 170. The sensors are conventional electrical transducers such as potentiometers, thermistors and/or magnetic speed pickups.

Internally, the electronic control module 147 comprises a number of conventional devices including a microprocessor with an internal clock and memory, an input/output device, and an array of proportional solenoid current drivers. One solenoid driver is dedicated to each solenoid control valve 215. The microprocessor delivers a command signal proportional to the desired solenoid current, and the current driver uses a Pulse Width Modulated voltage to produce the desired current. The solenoid control valves 215 are configured to maintain a flow of oil to the clutch sufficient to maintain a clutch pressure proportional to the solenoid current. Thus, the microprocessor can control the clutch pressure proportional to the command signal delivered to the solenoid driver circuit. Proportional solenoid current drivers are well known in the art, and need not be further discussed.

The microprocessor utilizes arithmetic units to control the transmission shifting and to perform diagnostics in accordance with software programs. Typically, the programs are stored in read-only memory, random-access memory or the like.

The speed sensors 150,155,160,165 are advantageously passive magnetic pickup type sensors. The intermediate speed sensor 165 is located between clutch four and clutch five and therefore indicates the total slip of clutch four. In the preferred embodiment, the sensors include two pickups spaced approximately one-quarter tooth apart so that both speed and direction information is provided. A circuit such as that shown in FIG. 3 is connected to each of the pickups to provide signals indicative of speed.

In the case of the intermediate and output speed sensors 160,165, the signals from the pickups are delivered to a D flip-flop. For each of the intermediate and output speed sensors 160,165, one of the pickups is connected to the D input while the other is connected to the clock input. This arrangement allows direction information to be provided. As is known in the art, the binary logic state at the D input when a leading edge of a pulse is received at the clock input will be the logic state at the output. For example, if pickup one is connected to the D input and pickup two is connected to the clock input, then whenever the rotating member is turning in a direction in which a given tooth passes pickup one before passing pickup two the flip-flop output is always logic "high". Similarly, when the rotating member is turning in the opposite direction, the output of the flip-flop remains logic "low". Thus the rotational direction is indicated by the logic state at the output of the D flip-flop. The rotational speed of the member is determined from the pulse frequency of the signal produced by the circuit associated with one of the pickups.

Turning now to FIG. 4, an algorithm performed by the electronic control module 147 to determine clutch slip in response to the speed and direction information provided by the speed sensors 155,160,165 is shown. In performing the functions of blocks 402, 404, and 406, the processor within the electronic control module 147 receives the signals from the speed sensor pickups and the D flip-flops to determine the torque converter speed ratio the torque converter output speed, and the speed and direction of the transmission intermediate member and transmission output member. As will be appreciated by those skilled in the art, the ratios of the input transfer gear and the output transfer gear are also used in the calculations of the transmission input member and the output member speeds, respectively. At block 408, the processor performs the algorithm illustrated in more detail in FIG. 5. For each clutch, the following relationships exist between slip and the input, intermediate, and output speeds:

Clutch 1 slip=$K_{11}$ (Input Spd.)+$K_{12}$ (Inter. Spd.)+$K_{13}$ (Output Spd.)

Clutch 2 slip=$K_{21}$ (Input Spd.)+$K_{22}$ (Inter. Spd.)+$K_{23}$ (Output Spd.)

Clutch 3 slip=$K_{31}$ (Input Spd.)+$K_{32}$ (Inter. Spd.)+$K_{33}$ (Output Spd.)

Clutch 4 slip=$K_{41}$ (Input Spd.)+$K_{42}$ (Inter. Spd.)+$K_{43}$ (Output Spd.)

Clutch 5 slip=$K_{51}$ (Input Spd.)+$K_{52}$ (Inter. Spd.)+$K_{53}$ (Output Spd.)

where:

$K_{ij}$ is a multiplication factor which represents a mathematical constant describing the relationship between a given transmission member speed and slip of a clutch, the multiplication factor is preferably a two-byte signed binary value, in the preferred embodiment the multiplication factors to be multiplied by the input speed signal for each of the speed clutches are set equal to zero; and the input, intermediate, and output speeds are preferably represented as signed binary values indicative of the rotational velocity of the respective member, one rotational direction is arbitrarily chosen as positive with the opposite direction being negative.

As shown in FIG. 5, a routine is provided to calculate the individual transmission clutch slips. Pointers are initialized to clutch one for both clutch slip values and the multiplication factors at blocks 502 and 504. The clutch number is set to 01 and the sum is zeroed at blocks 506 and 508. The clutch slip for clutch 01 is calculated in blocks 510, 512, and 514 by performing the calculations set forth above. The calculated clutch slip value for the selected clutch is stored and the clutch slip pointer is incremented in block 516. The multiplication factor pointer and the clutch number are incremented at blocks 518 and 520, respectively. The processor then determines at block 522 whether the slip for each clutch has been calculated.

The algorithm of FIG. 6 determines whether a selected clutch has failed to lock-up. For each clutch selected, the absolute value of calculated slip for the selected clutch is compared to a maximum speed at which the system will diagnose the clutch as being fully locked up. If the clutch slip is greater than or equal to the maximum, then the time since the start of engagement is compared to a maximum engagement time at block 604. The maximum engagement time is a constant selected in response to the expected time after the beginning of engagement at which the clutch is expected to be fully engaged. As shown in FIG. 7b, at the start of engagement, SET, the command for the on-coming clutch begins high and then reduces as the clutch begins to fill. After the clutch has filled, modulation of the clutch to effect a smooth engagement begins at MET. As the clutch command increases during modulation, the relative rotational speed, or slip, of the clutches decreases as shown in FIG. 7c. The maximum engagement time used in block 604 is selected to correspond to the expected duration of time from the start of engagement until clutch slip is expected to be near zero, thus indicating full engagement. In the preferred embodiment, the maximum engagement time is equal to the modulation enable time, MET, plus a margin term. FIG. 7a illustrates the off-going clutch command. The off-going clutch is expected to be released prior to a maximum release time, MRT, corresponding to the modulation enable time for the selected oncoming clutch plus the desired slip time minus a margin, MET+DST−margin. After MRT, the off-going clutch should have released.

Returning now to FIG. 6, if the time since the start of engagement is greater than the maximum engagement time, MET plus desired slip time minus margin, then the fail to lock flag for the selected clutch is set at block 606. If the absolute value of clutch slip for the selected clutch is less than the maximum lock-up speed at block 602, then the fail to lock flag for the selected clutch is cleared at block 608 and the locked flag for that clutch is set at block 610.

FIG. 8 illustrates how the present invention fits into the broader default and diagnostic system included in the electronic control module. The functions performed in block 802 are set forth in the algorithms illustrated in the remaining Figures. The functions of blocks 804 and 806 are performed by portions of the default system that determine how control of the transmission should be affected by a diagnosed fault. One system performing such functions is disclosed in a copending patent application filed simultaneously herewith entitled "Transmission Control Default Operation" (Attorney Docket No. 94-110) which is incorporated herein by reference in its entirety.

In FIG. 9, block 902 checks the control solenoids 215 for electrical failures and is set forth in more detail in FIG. 11. Loss of the temperature sensor signal is indicated in block 904 and diagnostics performed when a shift is in progress and when a shift is not in progress are carried out in blocks 906 and 908, respectively. The shift in progress routine checks for mechanical failures in response to slip and is shown in more detail in FIGS. 3–17. The shift not in progress routine diagnoses mechanical and speed sensor problems and is illustrated in FIGS. 18–36.

FIG. 10 illustrates the inputs and outputs of the solenoid electrical failure routine. Inputs include flags set in response to a system (not shown) for diagnosing electrical problems in solenoids and include short circuit to ground, open circuit and short circuit to battery flags for each of the solenoid actuators. Outputs include clutch not engaged and clutch not released flags for each clutch. Details of this routine are shown in FIG. 11. For each solenoid, if one of the short to ground or open circuit flags is set, then the bit of the clutch nonengagement flag for the corresponding clutch is set, otherwise the bit of the clutch nonengagement flag for the corresponding clutch is cleared. If the short to battery flag is set, then the bit of the clutch nonrelease flag is set, otherwise the clutch nonrelease flag is cleared.

FIG. 12 illustrates the routine in which problems with the temperature sensor are diagnosed. If any fault flags corresponding to an out of range value for temperature is received, then the oil temperature sensor fault flag is set, otherwise, the flag is cleared.

The inputs and outputs of the shift in progress diagnostic routine are illustrated in FIG. 13. Inputs include a flag indicating a beginning of a shift, identification of each oncoming and offgoing clutch from the shift control logic based on operator input, an indication of maximum locked-up speed for the selected clutches, clutch slip values, start of engagement time, modulation enable time, desired slip time, a margin term to be subtracted from the modulation enable time plus desired slip time indicating the time at which the offgoing clutch should have released, and a failure to lock flag for the selected clutches.

Turning now to FIGS. 14a and 14b, operation of the shift in progress diagnostics is disclosed. If the shift in progress flag from the shift control logic is not present, then the debounced direction and speed clutch failure to lock flags are cleared. If the shift is found to be in progress in block 1402, then the electronic control module determines whether any of the transmission speed sensors have failed. If a transmission speed sensor has failed, then the shift in progress routine is exited since the remaining diagnostics rely upon speed sensor information.

If the speed sensors have not failed, then the processor determines whether the shift involves only the direction clutches but not the speed clutches in response to the offgoing speed clutch being the same as the oncoming speed clutch and whether the shift is to or from no clutch neutral. If the shift is direction only, then block 1418 is executed to determine whether the speed clutch is slipping since the speed clutch is expected to be locked up throughout such a shift. The detail of block 1418 is shown in FIG. 16. If the shift is to no clutch neutral, control passes to block 1420. If the shift is from no clutch neutral, then control passes to block 1416 where the processor determines whether the oncoming speed clutch has failed to engage. The detail of block 1416 is shown in FIG. 15. If none of the conditions of blocks 1408, 1410, and 1412 are satisfied, then the processor determines whether the offgoing speed clutch has not released and whether the oncoming speed clutch has not engaged at blocks 1414 and 1416, respectively. The detail of block 1414 is illustrated at FIG. 17.

If the processor determines at block 1420 that the shift is speed only in response to the oncoming direction clutch being the same as the offgoing direction clutch, then the processor determines whether the oncoming direction clutch has failed to engage as set forth in more detail in FIG. 15. If the shift is not speed only, then the processor determines whether the oncoming direction clutch is such that the transmission will be in neutral. If so, then the processor determines at block 1426 whether the direction clutch has failed to release by using the algorithm of FIG. 20 and including a time delay to allow the releasing direction clutch to fully disengage before indicating a direction clutch failure to release fault. Otherwise, if the shift is not from neutral or no clutch neutral, then the processor determines whether the offgoing direction clutch is not released. Control then passes to block 1432 at which the processor determines whether the oncoming direction clutch has failed to engage.

Turning now to FIG. 15, the algorithm used to determine whether an oncoming clutch has failed to engage is shown. If the fail to lock flag is not set, as described in connection with FIG. 6, then the oncoming clutch slipping flag is not set, otherwise the oncoming clutch slipping flag is set. Following debounce of the clutch slipping flag, the processor determines at blocks 1510, 1512, and 1514 whether the clutch nonengagement flag for the selected oncoming clutch should be set in response to the status of the debounced clutch slipping flag.

The speed clutch slip diagnostic is illustrated in FIG. 16. The slip of the selected speed clutch is compared to the maximum lockup speed plus a margin term. If the slip is greater than the sum, then the speed clutch slipping flag is set, otherwise the speed clutch slipping flag is cleared. The speed clutch slipping flag is debounced at block 1608 and the corresponding bit of the clutch nonengagement flag is set according to the state of the debounced clutch slipping flag.

The processor determines whether an offgoing clutch is not released using the algorithm shown in FIG. 17. The start of engagement time, which is an indication of the time since the beginning of the shift, for the selected oncoming clutch is compared to the modulation enable time plus the desired slip time minus the margin, as described in connection with FIG. 7. If the start of engagement time is greater than or equal to the modulation enable time plus the desired slip time minus the margin, slip of the selected clutch is less than maximum lockup speed, and the transmission output speed is greater than a predetermined minimum, then the flag indicating clutch failure to release is set. Otherwise, the clutch failure to release flag is cleared. The flag is debounced and the bit of the clutch nonrelease flag is set in accordance with the debounced clutch failure to release flag at blocks 1714, 1716, and 1718.

The inputs and outputs of the shift not in progress diagnostic routine are shown in FIG. 18. The inputs include an indication of the currently engaged gear, maximum locked speed, clutch slip, intermediate speed, and output speed, and fault flags for the transmission intermediate and output speed sensors. Outputs include clutch nonengagement flags for each clutch, clutch nonreleased flags for each clutch, and fault flags for each of the torque converter output speed sensor, the transmission intermediate speed sensor, and the transmission output speed sensor.

The algorithm of the shift not in progress diagnostic routine is shown in FIG. 19. If a shift is not in progress, the clutch engagement status is determined at block 1904, the detail of which is included in FIG. 24. If the current gear is neutral, no clutch neutral, or neutralizer, then the engine speed signal is tested at block 1908, the torque converter output speed sensor is diagnosed at block 1910, and the processor determines whether the direction clutch has failed to release at block 1912. The details of these functions are set forth in FIGS. 21, 22 and 20, respectively.

Figure 25:
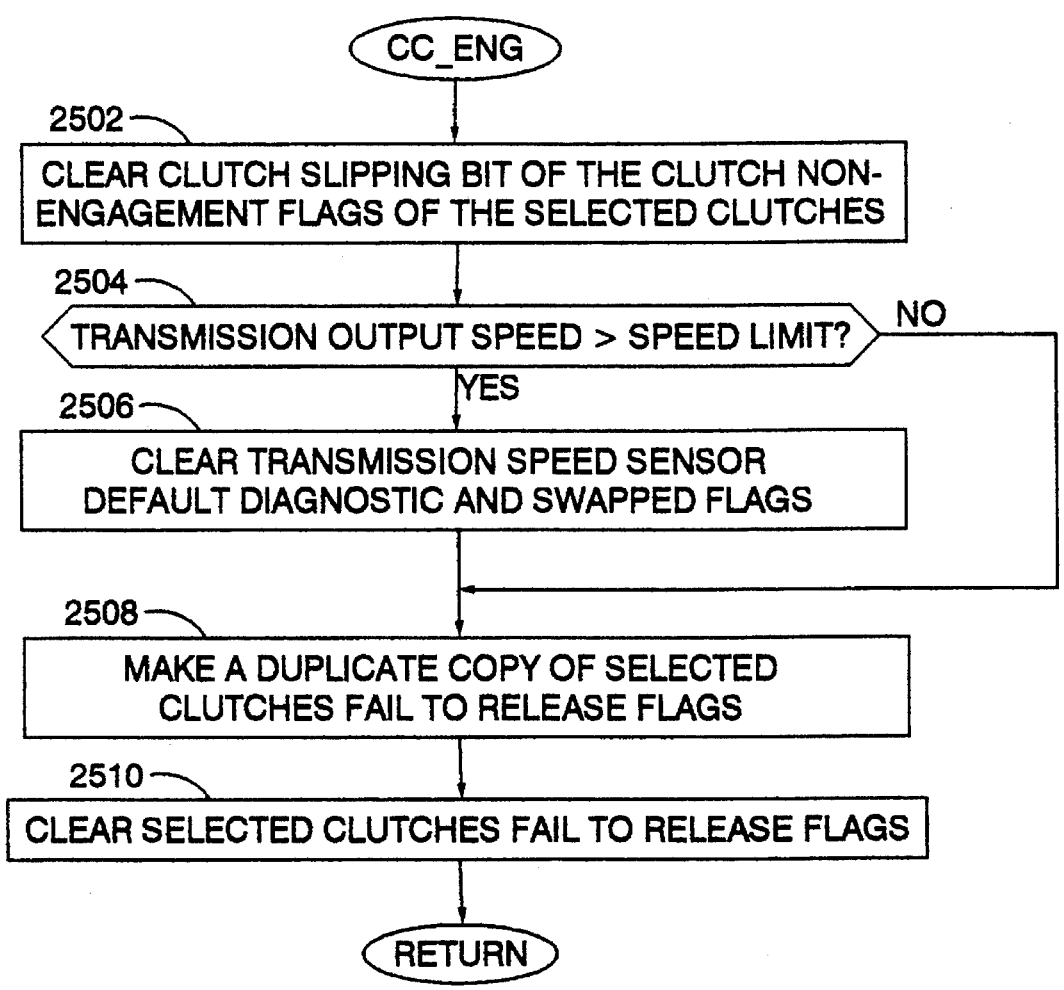

If the current gear is not neutral, neutralizer, or no clutch neutral, then the selected clutch engagement flag is debounced at block 1914. If the debounce flags indicate that the selected clutches are engaged, then the undebounced flags are checked to determine whether they indicates engagement of the selected clutch. If so, then the clutch slipping bit of the clutch nonengagement flag of selected clutches is cleared to indicate correct clutch engagement as shown in FIG. 25. If the debounced clutch engagement flag for the selected gear indicates nonengagement, then the undebounced flag is checked. If nonengagement is indicated by the undebounced flag as well, then the processor determines whether direction information has been lost by the intermediate speed sensor at block 1922. Such loss of direction information may be due, for example, to a loss of the signal from one of the two pickups for the intermediate sensor. If direction information for the intermediate sensor is lost, then the same test is made on the signal from the transmission output speed sensor. If both direction signals are lost then diagnostics are performed adjusting both speed sensor directions. If only intermediate speed sensor direction is lost, then diagnostics are performed compensating for the loss of direction. If the intermediate speed sensor is found to have direction information at block 1922, then the transmission output speed sensor is checked at block 1930. If direction information exists for both sensors, then diagnostics are performed at block 1932, otherwise the diagnostics at block 1934 are performed with compensation for the loss of direction information on the output speed sensor.

Figure 20:
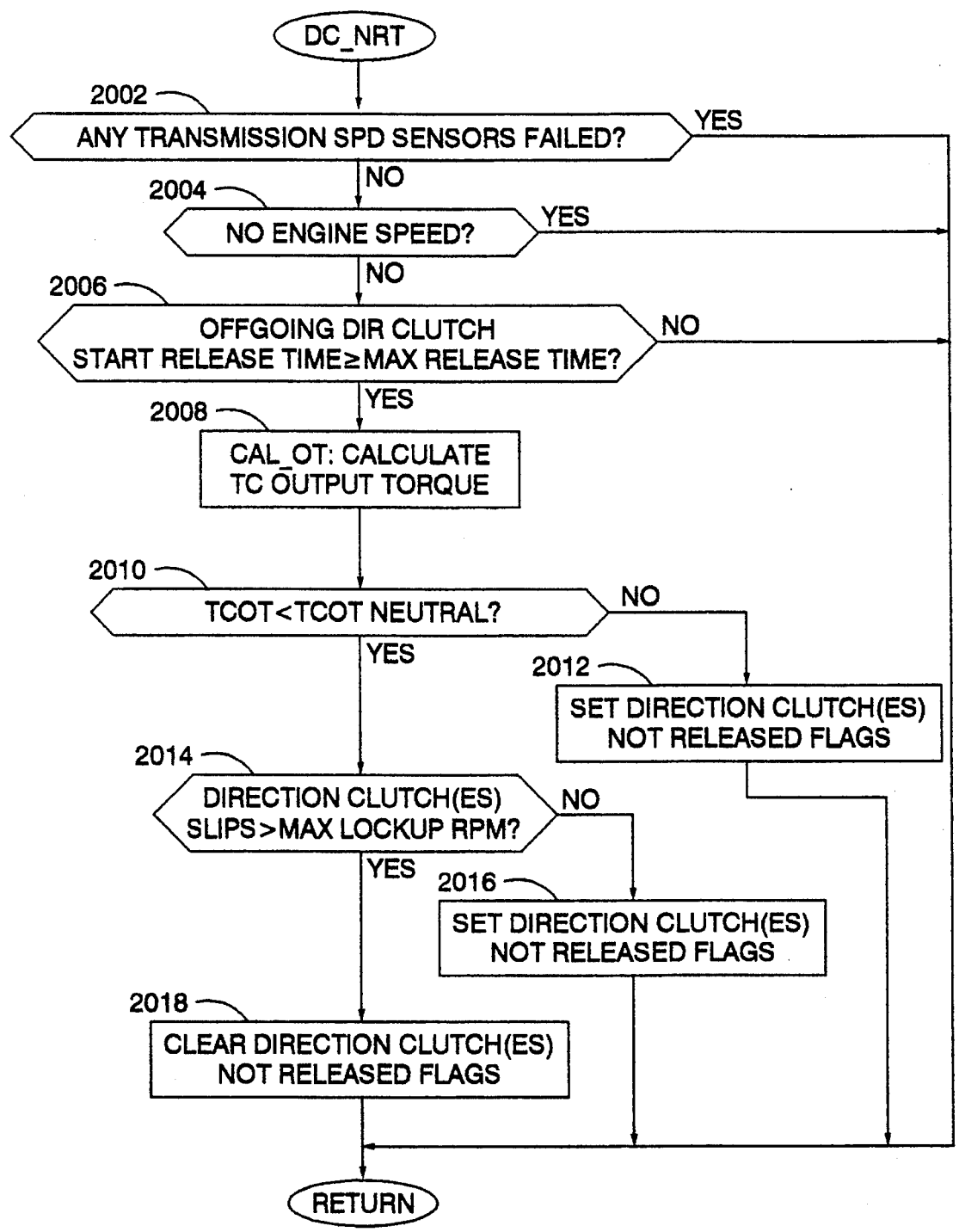

The routine for determining if any of the direction clutches are engaged when the vehicle is in neutral or in no clutch neutral is illustrated in FIG. 20. If none of the transmission speed sensors have failed and engine speed is available, then the start release time for the offgoing direction clutch is compared to the maximum release time where the maximum release time is the expected time following the start of engagement of the oncoming clutch at which the offgoing clutch is to be released. If the start release time exceeds the maximum release time, then the torque converter output torque is calculated at block 2008. In the preferred embodiment, output torque is selected from a look-up table stored in memory in response to the ratio of torque converter output speed to engine speed. The value obtained from the look-up table is then normalized as a function of engine speed by multiplying the look-up table value by the square of engine speed divided by a constant. The detail of torque converter output torque calculation is described in connection with FIG. 23.

If the torque converter output torque is less than a predetermined minimum value, then direction clutch slip is compared to maximum lockup speed. If direction clutch slip is greater than maximum lockup speed, then the direction clutch not released flag is cleared; if not, then the direction clutch not released flag is set. If the torque converter output torque is not less than the predetermined minimum, then the clutch not released flag for the direction clutches are set.

Figure 21:
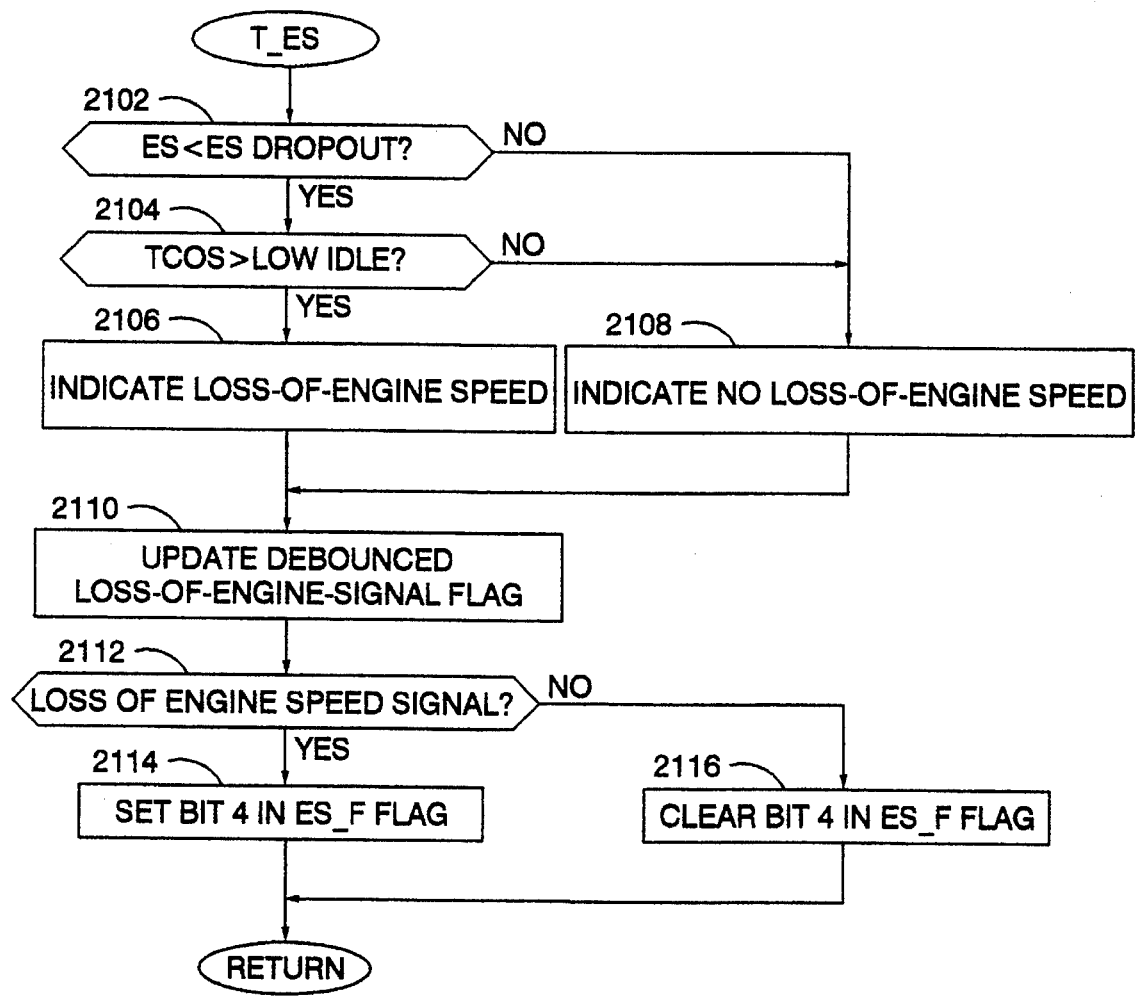

Turning now to FIG. 21, if engine speed is less than a minimum value and torque converter output speed is greater than a low idle value, then a flag is set to indicate loss of engine speed; otherwise the flag indicates no loss of engine speed. The loss of engine speed signal is debounced at block 2110 and the debounced loss of engine speed flag is used to properly set the engine speed fault flag in blocks 2112, 2114, and 2116.

Figure 22:
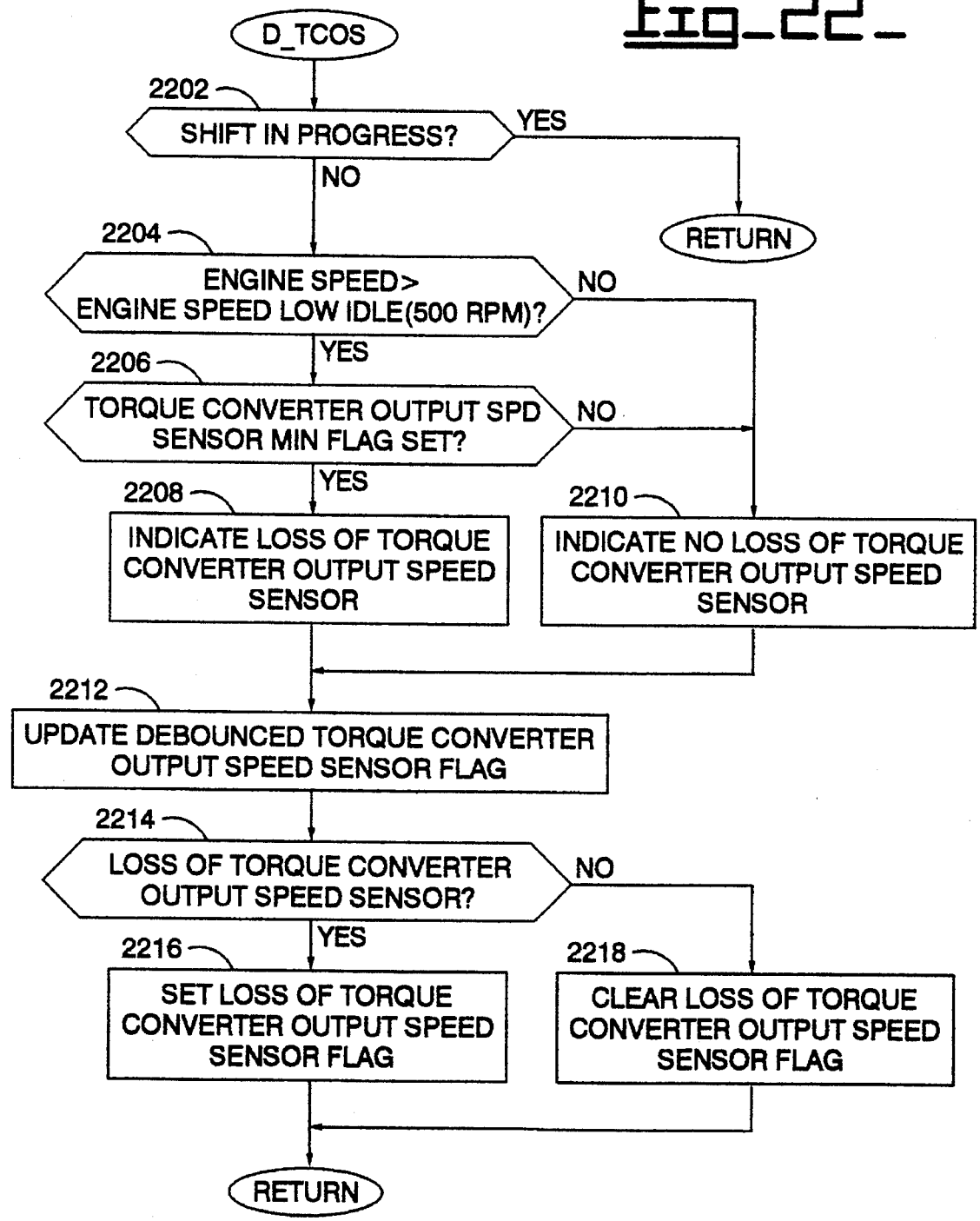

The diagnostics for torque converter output speed is shown in FIG. 22. If the shift in progress flag is not set, then engine speed is compared to a predetermined minimum and the flag corresponding to torque converter output speed being less than a minimum value. If engine speed is greater than the minimum and the torque converter output speed sensor minimum flag is set, then a flag is set to indicate loss of the torque converter output speed sensor, otherwise the flag is cleared to indicate no loss of the torque converter output speed sensor. The torque converter output speed sensor flag is debounced at block 2212 and the flag corresponding to debounced loss of torque converter output speed sensor is either set or cleared in blocks 2214, 2216, and 2218.

Figure 23:
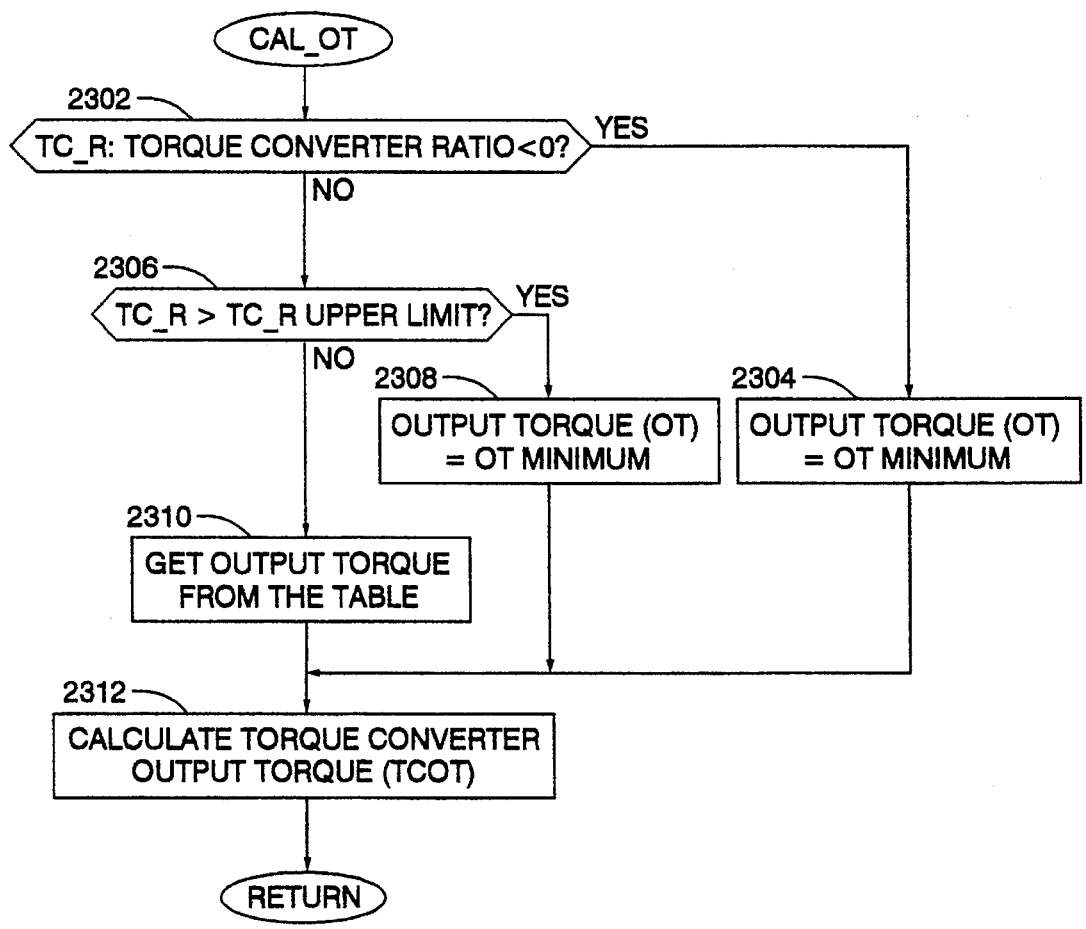

Torque converter output torque is calculated using the algorithm shown in FIG. 23. If the torque converter ratio is less than zero or greater than a predefined maximum ratio then output torque is set equal to a predefined minimum value at blocks 2304 and 2308, respectively. If the torque converter ratio is within the range from zero to the maximum, then the output torque is obtained from a look-up table stored in memory. The output torque is then normalized as a function of engine speed by multiplying the table value by the square of engine speed divided by a constant.

Figure 24:
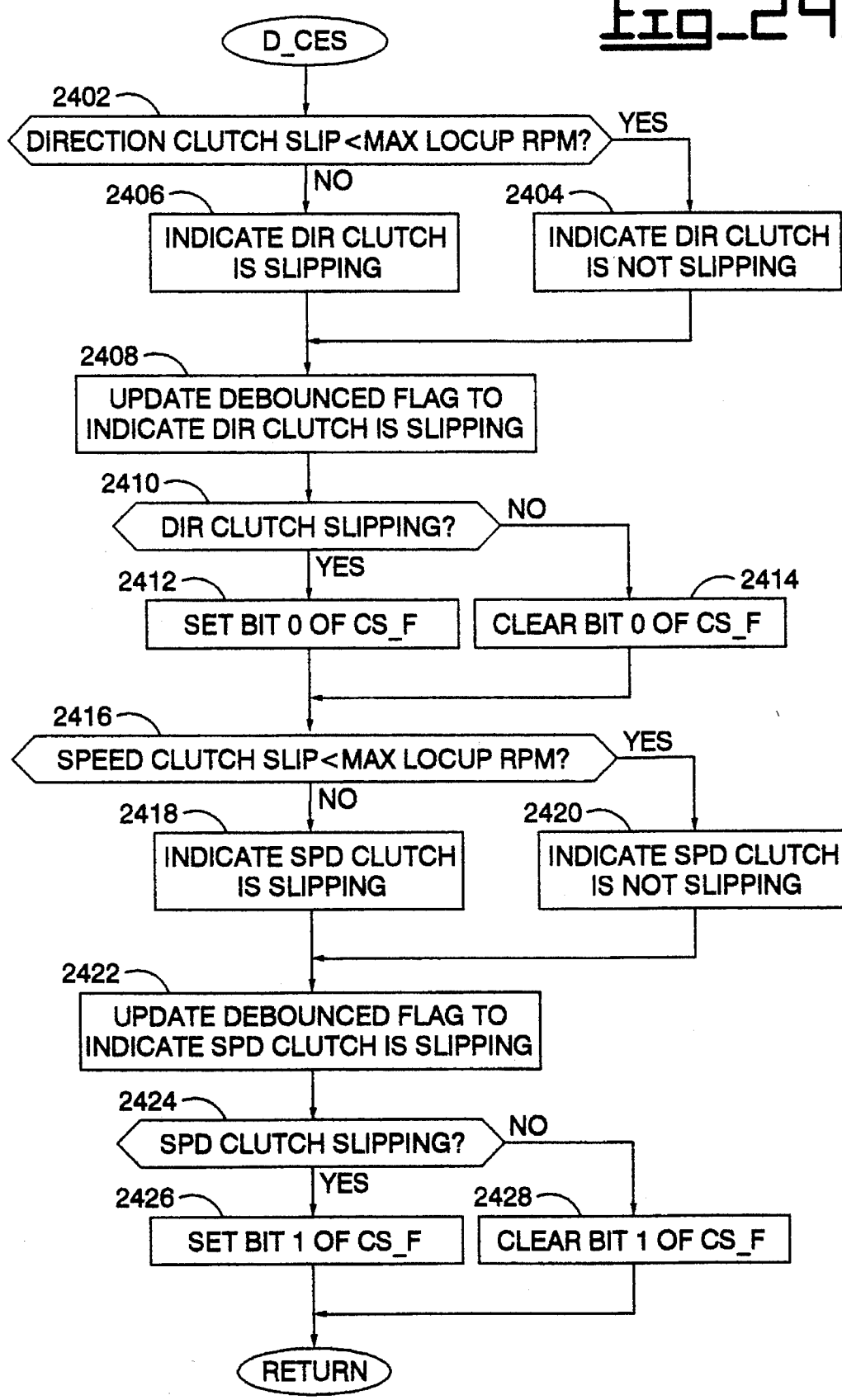

The routine for determining selected clutches debounced engagement status when a shift is not in progress is shown in FIG. 24. If direction clutch slip is greater than or equal to maximum lockup speed, then the direction clutch slipping flag is set, otherwise the direction clutch slipping flag is cleared. The direction clutch slipping flag is debounced at block 2408 and the appropriate bit of the clutch slipping flag is set or cleared in response to the debounced direction clutch slipping flag at blocks 2410, 2412, and 2414. The process is repeated for speed clutch slip at blocks 2416 through 2428 whereby the appropriate bit of the clutch slipping flag is set for the speed clutch.

The algorithm shown in FIG. 25 is used to clear selected clutches slipping flags, speed sensor diagnostics flags, and clutches failed to release flags. Before the speed sensor diagnostic fault flags are cleared, the output speed is compared to a predefined minimum. A duplicate copy of the selected clutches failed to release flags are made in block 2508 prior to clearing in block 2510.

Figure 26:
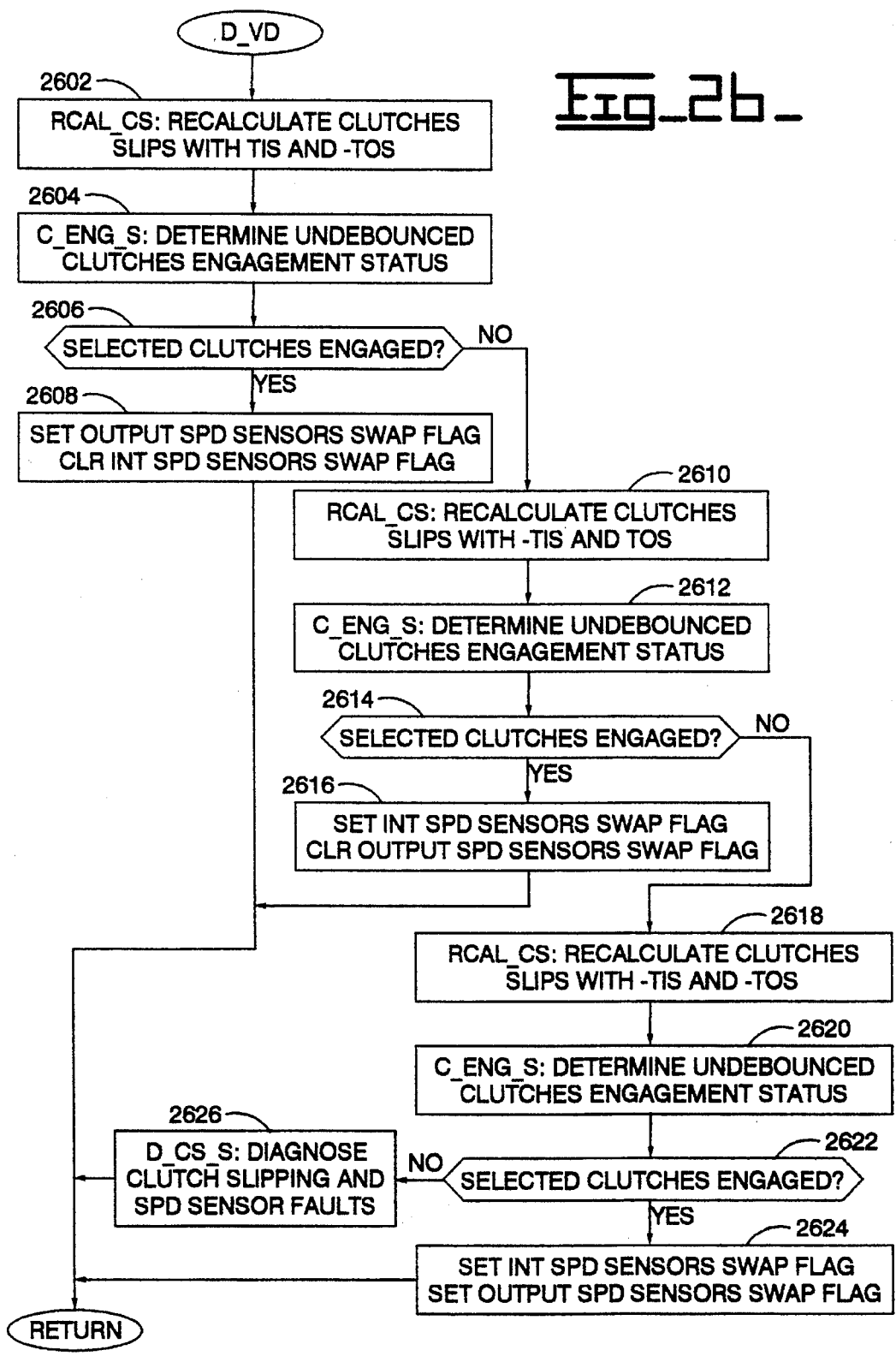

Turning now to FIG. 26, the algorithm for diagnostics when direction information is available from the intermediate and output speed sensors is illustrated. At block 2602 the clutch slips are recalculated with the output speed sensor having a changed direction and the undebounced clutches engagement status is checked at block 2604 using the recalculated clutch slips. If the selected clutches are now indicated as being engaged, then the output speed sensor swap flag is set and the intermediate speed sensor swap flag is cleared. In this way, an indication is provided that the two pickups of the output speed sensor have been swapped and therefore the output speed sensor is producing reversed direction information.

If the selected clutches are found to be not engaged at block 2606, then clutch slips are recalculated using a reversed direction for the intermediate speed sensor. Undebounced clutch engagement status is checked at block 2612 using the recalculated clutch slips from block 2610. If the selected clutches are found to be engaged in block 2614 then the output speed sensor swap flag is cleared and the intermediate speed sensor swap flag is set to indicate that the connections to the two pickups of the intermediate speed sensor have been swapped and are therefore producing reversed direction information.

If the selected clutches are found to be not engaged at block 2614, then clutch slips are recalculated using a reversed direction for both the output and the intermediate speed sensors. Undebounced clutch engagement status is checked at block 2620 using the recalculated clutch slips from block 2618. If the selected clutches are found to be engaged in block 2614 then the output speed sensor swap flag and the intermediate speed sensor swap flag are set to indicate that the connections to the two pickups of both the output and the intermediate speed sensors have been swapped and are therefore producing reversed direction information. If the selected clutches are not indicated as being engaged at block 2622, the clutch slipping and speed sensor faults are diagnosed at block 2626 as shown in more detail in FIG. 28.

Figure 27:
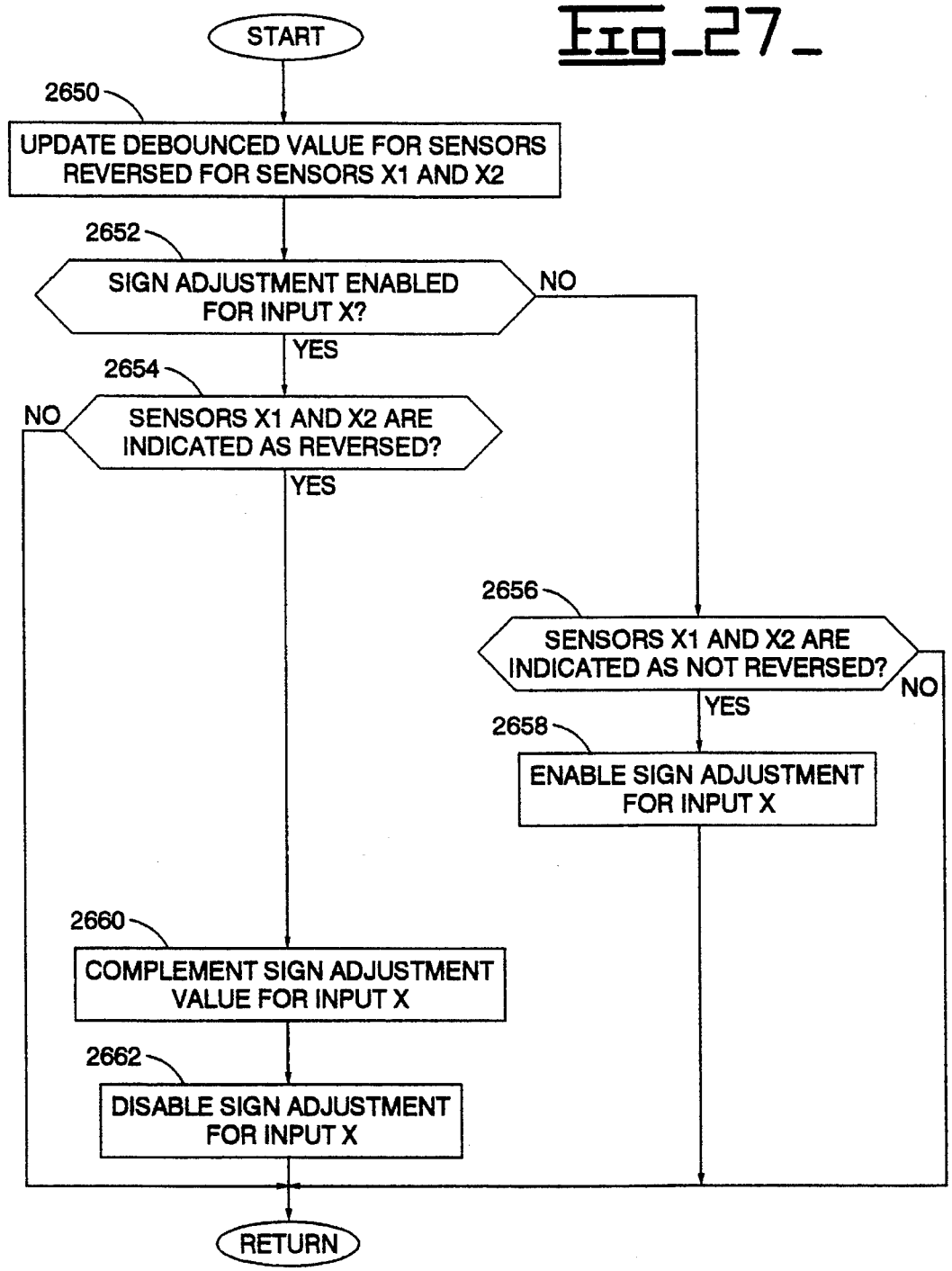

If the speed sensor inputs are found to be swapped, the algorithm in FIG. 27 complements the direction information for the affected speed sensor. At block 2650, the debounced value for the speed sensor pickups swapped flag for the two inputs of a speed sensor are updated. If the sign adjustment is not enabled for the speed sensor, then block 2656 is used to determine whether the pickups for the speed sensor are indicated as being not reversed. If the pickups are indicated as not reversed, then the sign adjustment for that sensor is enabled at block 2658.

If the sign adjustment is indicated as being enabled at block 2652, then at block 2654 it is determined whether the pickups are reversed. If the pickups are reversed, then the sign adjustment value is complemented and the sign adjustment is disabled at blocks 2660 and 2662, respectively.

Turning now to FIG. 28, if based on the clutch engagement status it is found that both the speed and direction are slipping, then a sensor problem is indicated and the processor performs the functions of block 2704 to diagnose the intermediate and output speed sensor failures as shown in more detail in FIG. 29. If only the direction clutch is found to be slipping in block 2706, then a direction clutch problem or torque converter output speed problem are diagnosed in block 2708 is performed as shown in more detail in FIGS. 31a and 31b. If only the speed clutch is indicated as being slipping based on the clutch engagement status routine, then the speed clutch slipping flag is set at block 2712.

In response to the processor determining at block 2702 that clutch slipping flags are set for both direction and speed clutches, the algorithm of FIG. 29 calculates the overall ratio (output speed/input speed) and compares the calculated value with the maximum and minimum theoretical overall ratios for the selected gear found in a look-up table stored in memory. If the current gear is a forward gear, then the measured overall ratio is calculated in the forward direction; otherwise the overall ratio is calculated in the reverse direction. The maximum and minimum theoretical overall ratios for the selected gear are retrieved from the look-up table in block 2808. As shown in FIG. 30, if the measured overall ratio is within the range of values defined by the retrieved maximum and minimum theoretical overall ratios, then a problem with the intermediate speed sensor is indicated and the corresponding flag is set; otherwise a problem with the output speed sensor is indicated and the corresponding flag is set.

FIGS. 31a and 31b illustrate a routine for determining if the direction clutch is slipping or the torque converter output speed sensor signal is incorrect. If the engine speed is less than a minimum, then the clutch slipping flag is set at block 3004. If the engine speed is greater than or equal to the minimum, then the torque converter ratio (torque converter output speed divided by engine speed) is compared to the speed ratio at null output torque. In the preferred embodiment, the speed ratio at null output torque is near one. If the torque converter ratio is greater than or equal to the null output torque speed ratio and if the current gear is not in the forward direction, then if the direction clutch slip is not negative, the clutch slipping bit of the flag is set. If the direction clutch slip is negative, then the torque converter output speed sensor failure flag is set if the direction clutch slip sign matches the expected sign.

As will be understood by those skilled in the art, if a particular direction is selected, any slip will be in the opposite direction and therefore the value for the indicated slip will have an opposite sign from the selected direction. If, however, the sign of the indicated slip is the same as the sign for the selected direction, then a sensor failure is indicated.

Thus, blocks 3020 through 3024 function identically to blocks 3012 through 3016 to compare the indicated slip direction with the expected direction and responsively indicating either a clutch slip or a torque converter output sensor fault. An alternative embodiment for performing this function is illustrated by blocks 3028 through 3034 and blocks 3036 through 3042 in FIG. 31b.

The diagnostic routine with lost output speed direction information is shown in FIG. 32. The clutch slips are recalculated with the sign of the transmission output speed sensor value being reversed. The recalculation of clutch slips includes both the selected direction and selected speed clutches as shown in FIG. 36. Based on the recalculated slips, clutch engagement status is redetermined as set forth in FIG. 37. If the selected clutches are engaged, then the routine of FIG. 25 is executed, otherwise a flag is set to indicate unspecified failures.

The diagnostic routine with lost intermediate speed direction information is shown in FIG. 33. The clutch slips are recalculated with the sign of the transmission intermediate speed sensor value being reversed. The recalculation of clutch slips includes both the selected direction and selected speed clutches as shown in FIG. 36. Based on the recalculated slips, clutch engagement status is redetermined as set forth in FIG. 37. If the selected clutches are engaged, then the routine of FIG. 25 is executed to clear selected clutches slipping flags, speed sensor diagnostics flags, and clutches failed to release flags, otherwise a flag is set to indicate unspecified failures.

The diagnostics with both lost intermediate and lost output speed direction information is shown in FIG. 34. The clutch slips are recalculated with the sign of the transmission intermediate speed sensor value being reversed, the sign of the transmission output speed sensor value being reversed, and the signs of the both the transmission intermediate and output speed sensor values being reversed in blocks 3302, 3310, and 3316, respectively. The recalculation of clutch slips includes both the selected direction and selected speed clutches as shown in FIG. 36. Based on the slips from each recalculation, clutch engagement status is redetermined as set forth in FIG. 37. If the selected clutches are engaged, then the routine of FIG. 25 is executed, otherwise a flag is set to indicate unspecified failures.

FIG. 37 illustrates the undebounced determination of clutch engagement status of the current selected clutches. The clutch slipping flag is cleared at block 3602 and the appropriate bits of the clutch slipping flag are set at blocks 3606 and 3610 in response to the direction clutch slip and speed clutch slip being greater than maximum lockup speed at blocks 3604 and 3608, respectively.

Industrial Applicability

The present invention is used in connection with transmissions to diagnose speed sensor, clutch engagement, and clutch nonengagement failures. These faults could be due to electrical or mechanical problems. The electrical problems are those associated with solenoids such as short circuit to ground, open circuit, and short circuit to battery. These problems lead to clutch engagement and clutch disengagement problems. Speed sensor problems are also diagnosed. The mechanical problems include clutch slipping and clutch not released.

Other aspects, objects and advantages of the present invention can be obtained from a study of the drawings, the disclosure and the appended claims.

We claim:

1. An apparatus for detecting a fault condition in a transmission having a plurality of rotating components, a plurality of clutches, and a transmission control having a means for modulating the engagement of the clutches, comprising:

a plurality of speed sensors producing speed and direction signals in response to the rotational speed of a plurality of the rotating components;

means for calculating the relative rotational speed between two or more clutches in response to said speed and direction signals; and diagnostic means for indicating a fault condition in response to the relative rotational speed and the duration of a period of time.

2. An apparatus, as set forth in claim 1, wherein said fault condition indicates an offgoing clutch being not released.

3. An apparatus, as set forth in claim 1, wherein said fault condition indicates an oncoming clutch being not engaged.

4. An apparatus, as set forth in claim 1, wherein said plurality of speed sensors include an input speed sensor, an output speed sensor, and an intermediate speed sensor.

5. An apparatus, as set forth in claim 1, wherein the transmission includes direction clutches and speed clutches and including means for receiving a signal indicative of a direction only shift in the transmission and for responsively determining whether an engaged speed clutch is slipping.

6. An apparatus, as set forth in claim 1, wherein the transmission is connected to a torque converter and including:

means for determining whether an expected release time has expired;

means for determining the output torque of the torque converter; and wherein said diagnostic means indicates a fault condition in response to the output torque of the torque converter and expiration of said expected release time.

7. An apparatus, as set forth in claim 6, including means for determining whether the transmission is to be shifted to one of a neutral, neutralizer, or no clutch neutral state and wherein said fault condition indicates a direction clutch being not released.

8. An apparatus for detecting a fault condition in a transmission having a plurality of rotating components, and a plurality of clutches, comprising:

a plurality of speed sensors producing speed and direction signals in response to the rotational speed of a plurality of the rotating components;

means for calculating a relative rotational speed between two or more clutches in response to said speed and direction signals;

means for determining a first clutch engagement status in response to said relative rotational speed; and means for reversing the direction signal of at least one of said plurality of speed sensors and determining a second clutch engagement status using the reversed direction signal.

9. An apparatus, as set forth in claim 8, wherein at least one of said means for determining said first clutch engagement status and said means for determining a second clutch engagement status includes means for determining whether said relative rotational speed between said two or more clutches is greater than a predetermined threshold.

10. An apparatus, as set forth in claim 8, including means for identifying fault conditions in one or more of said plurality of speed sensors in response to said first clutch engagement status and said second clutch engagement status.

11. An apparatus, as set forth in claim 10, including means for complementing said direction signal produced by said one or more of said plurality of speed sensors identified as being in a fault condition in response to said first clutch engagement status and said second clutch engagement status.

12. An apparatus, as set forth in claim 8, including means for measuring an overall ratio, comparing the measured overall ratio to one or more predetermined constants, and responsively determining whether a fault exists in one of a transmission intermediate speed sensor and a transmission output speed sensor.

13. An apparatus, as set forth in claim 12, wherein said means for determining a first clutch engagement status includes means for indicating that both the direction and speed clutches are slipping.

14. An apparatus, as set forth in claim 8, wherein said plurality of speed sensors includes input, intermediate, and output speed sensors.

15. An apparatus, as set forth in claim 14, including means for indicating a loss of direction information from one or more of said speed sensors and wherein which of said direction signals are reversed is determined in response to the indicated loss of direction information.

16. An apparatus for detecting a fault condition in a transmission having a plurality of rotating components, and a plurality of clutches, comprising:

a plurality of speed sensors producing speed and direction signals in response to the rotational speed of a plurality of the rotating components, said plurality of speed sensors including a torque converter output speed sensor;

means for calculating a relative rotational velocity between two or more clutches in response to said speed and direction signals;

means for calculating a torque converter ratio and comparing said torque converter ratio to a predetermined constant; and means for determining whether a direction clutch is slipping or the torque converter output sensor signal is incorrect in response to the direction of said relative rotational velocity and the comparison of said torque converter ratio to said predetermined constant.

17. A method for detecting a fault condition in a transmission having a plurality of rotating components, a plurality of clutches, and a transmission control having a means for modulating the engagement of said plurality of clutches, comprising the steps of:

producing speed and direction signals in response to the rotational speed of a plurality of the rotating components;

calculating the relative rotational speed between two or more clutches in response to said speed and direction signals; and indicating a fault condition in response to the relative rotational speed and the duration of a period of time.

18. A method, as set forth in claim 17, wherein the fault condition indicates an offgoing clutch being engaged.

19. A method, as set forth in claim 17, wherein the fault condition indicates an oncoming clutch being disengaged.

20. A method, as set forth in claim 17, wherein said speed and direction signals indicate the rotational velocity of components at the input, output, and an intermediate point of the transmission.

21. A method, as set forth in claim 17, wherein the transmission includes direction clutches and speed clutches and including the step of receiving a signal indicative of a direction only shift and responsively determining whether an engaged speed clutch is slipping.

22. A method, as set forth in claim 17, wherein the transmission is connected to a torque converter and including the steps of:

determining whether an expected release time has expired;

determining the output torque of the torque converter; and indicating a fault condition in response to the output torque of the torque converter and expiration of the expected release time.

23. A method, as set forth in claim 22, including the step of determining whether the transmission is to be shifted to one of a neutral, neutralizer, or no clutch neutral state and wherein the fault condition indicates a direction clutch being not released.

24. A method for detecting a fault condition in a transmission having a plurality of rotating components, and a plurality of clutches, comprising the steps of:

producing speed and direction signals in response to the rotational speed of a plurality of the rotating components;

calculating a relative rotational speed between two or more clutches in response to the speed and direction signals;

determining a first clutch engagement status in response to the relative rotational speed;

reversing one of the direction signals and determining a second clutch engagement status using the reversed direction signal.

25. A method, as set forth in claim 24, wherein at least one of the steps of determining the first and second clutch engagement status includes the step of determining whether the relative rotational speed between the two or more clutches is greater than a predetermined threshold.

26. A method, as set forth in claim 24, including the step of identifying fault conditions in one or more speed sensors in response to the first and second clutch engagement status.

27. A method, as set forth in claim 26, including the step of complementing the direction signal produced by one or more of the plurality of speed sensors identified as being in a fault condition in response to the first clutch engagement status and the second clutch engagement status.

28. A method, as set forth in claim 24, including the steps of measuring an overall ratio, comparing the measured overall ratio to one or more predetermined constants, and responsively determining a fault in one of a transmission intermediate speed sensor and a transmission output speed sensor.

29. A method, as set forth in claim 24, including the step of indicating loss of direction information from one or more speed sensor and wherein the direction signals being reversed are determined in response to the indicated loss of direction information.

* * * * *